US012088026B2

(12) United States Patent
Ushijima et al.

(10) Patent No.: US 12,088,026 B2
(45) Date of Patent: Sep. 10, 2024

(54) FEEDER LINE AND ANTENNA DEVICE USING SAME

(71) Applicant: Mitsubishi Electric Corporation, Tokyo (JP)

(72) Inventors: Yu Ushijima, Tokyo (JP); Yosuke Tsuzaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 135 days.

(21) Appl. No.: 17/997,718

(22) PCT Filed: Jan. 29, 2021

(86) PCT No.: PCT/JP2021/003153
§ 371 (c)(1),
(2) Date: Nov. 1, 2022

(87) PCT Pub. No.: WO2022/059221
PCT Pub. Date: Mar. 24, 2022

(65) Prior Publication Data
US 2023/0170619 A1 Jun. 1, 2023

(30) Foreign Application Priority Data
Sep. 17, 2020 (WO) .................. PCT/JP2020/035188

(51) Int. Cl.
*H01Q 9/04* (2006.01)
*H01Q 1/48* (2006.01)
*H01Q 1/52* (2006.01)

(52) U.S. Cl.
CPC ............... *H01Q 9/045* (2013.01); *H01Q 1/48* (2013.01); *H01Q 1/52* (2013.01)

(58) Field of Classification Search
USPC .......................................................... 343/848
See application file for complete search history.

(56) References Cited

U.S. PATENT DOCUMENTS

2002/0158722 A1* 10/2002 Maruhashi .............. H01P 5/185 333/246
2004/0174228 A1* 9/2004 Kanno ................. H05K 1/0219 333/34

(Continued)

OTHER PUBLICATIONS

International Search Report for PCT/JP2021/003153 dated Apr. 13, 2021.

*Primary Examiner* — Hoang V Nguyen
*Assistant Examiner* — Brandon Sean Woods
(74) *Attorney, Agent, or Firm* — Sughrue Mion, PLLC; Richard C. Turner

(57) ABSTRACT

This feeder line includes: a plate-shaped dielectric substrate; a first conductor pattern dividing a first surface of the dielectric substrate into a first area and a second area; a first-area ground conductor pattern formed in the first area; a second-area ground conductor pattern formed in the second area; a second-surface ground conductor pattern formed on a second surface; a second conductor pattern connecting the first conductor pattern and one or both of the first-area ground conductor pattern and the second-area ground conductor pattern; a plurality of conductors and connecting between the second-surface ground conductor pattern, and the first-area ground conductor pattern and the second-area ground conductor pattern; and a conductive member connecting the first-area ground conductor pattern and the second-area ground conductor pattern. A length of the second conductor pattern is an odd multiple of ¼ of a wavelength of a signal propagating through the first conductor pattern.

13 Claims, 24 Drawing Sheets

(56) References Cited

U.S. PATENT DOCUMENTS

| | | | | |
|---|---|---|---|---|
| 2007/0152885 | A1* | 7/2007 | Sorvala | H01Q 1/38 343/702 |
| 2009/0267711 | A1* | 10/2009 | Kawabata | H01P 1/227 333/81 A |
| 2012/0326812 | A1* | 12/2012 | Ohhira | H01P 3/006 333/238 |
| 2015/0008991 | A1* | 1/2015 | Yuasa | H05K 1/0245 333/239 |
| 2018/0267139 | A1 | 9/2018 | Park | |

* cited by examiner

FEEDER LINE AND ANTENNA DEVICE USING SAME

CROSS REFERENCE TO RELATED APPLICATIONS

This application is a National Stage of International Application No. PCT/JP2021/003153 filed Jan. 29, 2021, claiming priority based on PCT Application No. PCT/JP2020/035188 filed Sep. 17, 2020.

TECHNICAL FIELD

The present disclosure relates to a feeder line and an antenna device using the same.

BACKGROUND ART

An antenna device is a device that transmits a microwave band or millimeter-wave band high-frequency signal. The antenna device includes an antenna, an integrated circuit (IC) which is a high-frequency signal generator for generating a high-frequency signal, and a feeder line. The feeder line connects the antenna and the IC. A configuration in which an IC is mounted to the same substrate surface of a dielectric substrate as the substrate surface where an antenna and a feeder line are formed, is disclosed (see, for example, Patent Document 1).

As in the disclosed configuration, the antenna and the IC mounted on the antenna substrate where the antenna is formed are connected via a feeder line which is a microstrip line, for example. In general, the IC is covered by a shield shaped from a material such as metal or conductive resin. The shield is provided for preventing the IC from becoming an electromagnetic disturbance source and for preventing the IC from being subjected to electromagnetic interference from outside. The shield has such a structure that avoids the feeder line routed on the antenna substrate. The structure that avoids the feeder line is, for example, a structure in which the shield is placed while straddling the feeder line, and this structure is called a tunnel. The shield is mounted on a ground conductor pattern provided to the antenna substrate, and thus is grounded.

CITATION LIST

Patent Document

Patent Document 1: Specification of US Patent application publication No. 2018/0267139

SUMMARY OF THE INVENTION

Problems to be Solved by the Invention

Unnecessary radio waves having a frequency lower than a desired frequency used in the antenna device are noise. In general, the tunnel is provided with such a size that noise does not propagate through a hollow part of the tunnel to the inside of the shield. Therefore, in the antenna device, noise propagating through the hollow part of the tunnel to the inside of the shield is suppressed. However, noise also propagates to the inside of the shield through a path passing the feeder line routed on the antenna substrate. There is a problem that the IC does not normally operate due to the influence of such noise passing through the feeder line.

The present disclosure has been made to solve the above problem, and an object of the present disclosure is to provide a feeder line having high noise immunity and an antenna device in which a high-frequency signal generator normally operates.

Solution to the Problems

A feeder line according to the present disclosure includes: a dielectric substrate formed in a plate shape; a first conductor pattern formed on a first surface of the dielectric substrate and extending from a first end surface side of the dielectric substrate toward a second end surface side opposite to the first end surface so as to divide the first surface of the dielectric substrate into a first area and a second area, an end on the first end surface side and an end on the second end surface side of the first conductor pattern serving as signal input/output ends; a first-area ground conductor pattern formed in the first area divided by the first conductor pattern on the first surface of the dielectric substrate, to be grounded; a second-area ground conductor pattern formed in the second area divided by the first conductor pattern on the first surface of the dielectric substrate, to be grounded; a second-surface ground conductor pattern formed on a second surface on a side opposite to the first surface of the dielectric substrate, to be grounded; at least one second conductor pattern formed on the first surface of the dielectric substrate and connecting the first conductor pattern and one or both of the first-area ground conductor pattern and the second-area ground conductor pattern; a plurality of conductors penetrating the dielectric substrate and connecting between the second-surface ground conductor pattern, and the first-area ground conductor pattern and the second-area ground conductor pattern; and a conductive member connecting the first-area ground conductor pattern and the second-area ground conductor pattern while straddling the first conductor pattern. A length of the one second conductor pattern is an odd multiple of ¼ of a wavelength of a signal propagating through the first conductor pattern.

An antenna device according to the present disclosure includes: the feeder line according to the present disclosure; a high-frequency signal generator connected to one of the input/output ends of the first conductor pattern included in the feeder line; and an antenna connected to another of the input/output ends of the first conductor pattern included in the feeder line.

Effect of the Invention

The feeder line according to the present disclosure has the second conductor patterns connecting the first conductor pattern having the signal input/output ends at the ends thereof and the first-area ground conductor pattern to be grounded, and the length of each of the second conductor patterns is ¼ of the wavelength of the signal propagating through the first conductor pattern. Therefore, a signal having the pass frequency propagates without being reflected, and a signal having a frequency other than the pass frequency, i.e., noise, does not propagate. Thus, noise propagating through the first conductor pattern formed on the dielectric substrate can be suppressed, whereby the feeder line having high noise immunity can be obtained.

The antenna device according to the present disclosure includes: the feeder line according to the present disclosure; the high-frequency signal generator connected to one of the input/output ends of the first conductor pattern included in the feeder line; and the antenna connected to another of the input/output ends of the first conductor pattern included in the feeder line. Therefore, a signal having the pass frequency propagates through the feeder line without being reflected, and a signal having a frequency other than the pass frequency, i.e., noise, does not propagate through the feeder line. Thus, it is possible to obtain the antenna device in which the high-frequency signal generator normally operates.

DESCRIPTION OF EMBODIMENTS

Figure 1:
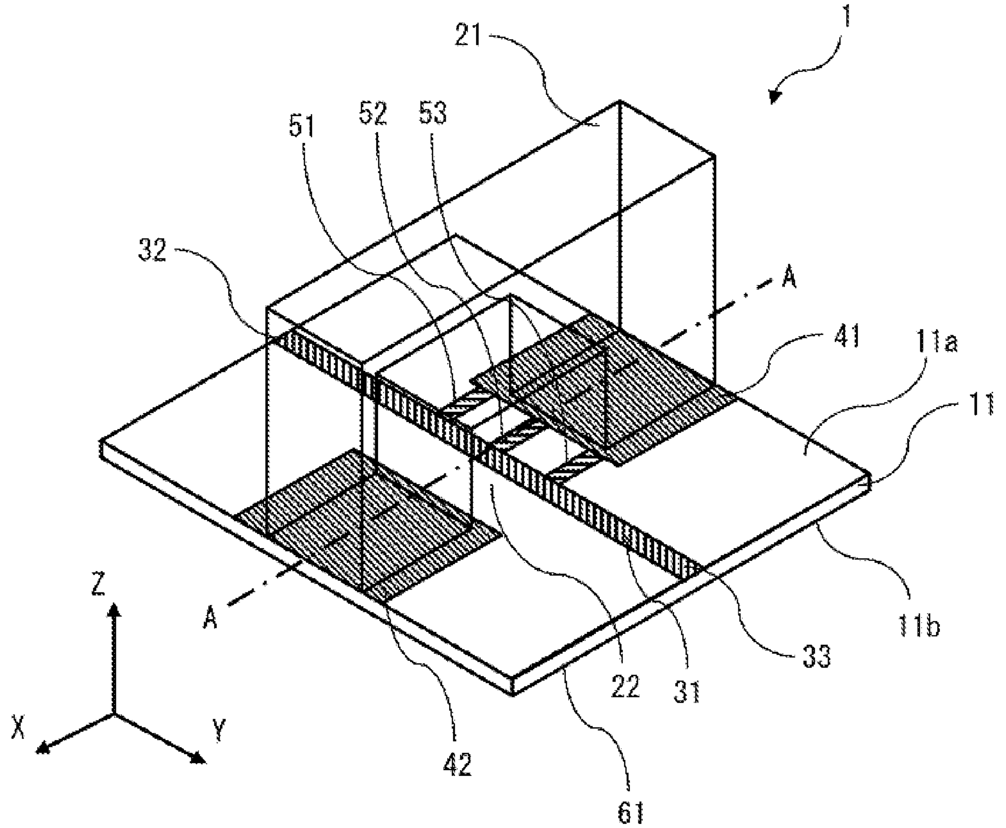
FIG. 1 is a perspective view schematically showing a feeder line according to embodiment 1.

Hereinafter, a feeder line and an antenna device using the same, according to embodiments of the present disclosure, will be described with reference to the drawings. In the drawings, the same or corresponding members and parts are denoted by the same reference characters, to give description. Unless specifically described, the material, the shape, placement, and the like of each component described in the embodiments are not intended to limit the present disclosure to those described.

Embodiment 1

Figure 2:
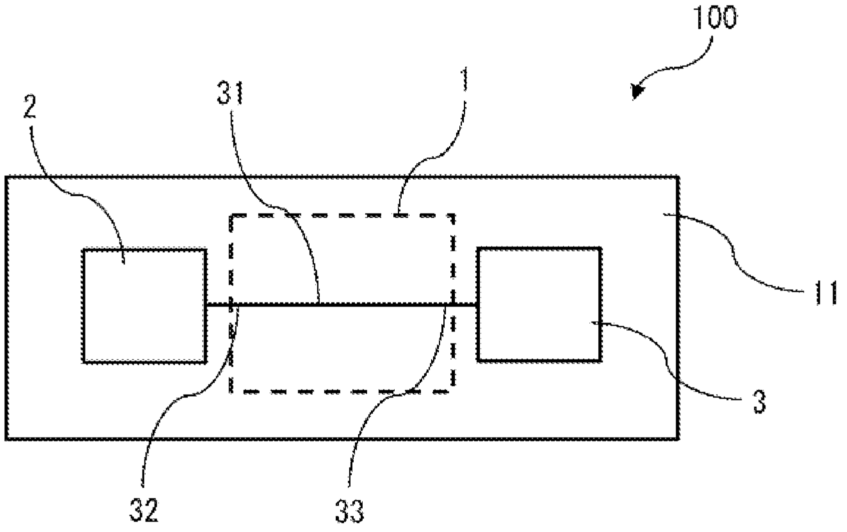
FIG. 2 is a schematic view schematically showing an antenna device using the feeder line according to embodiment 1.
Figure 3:
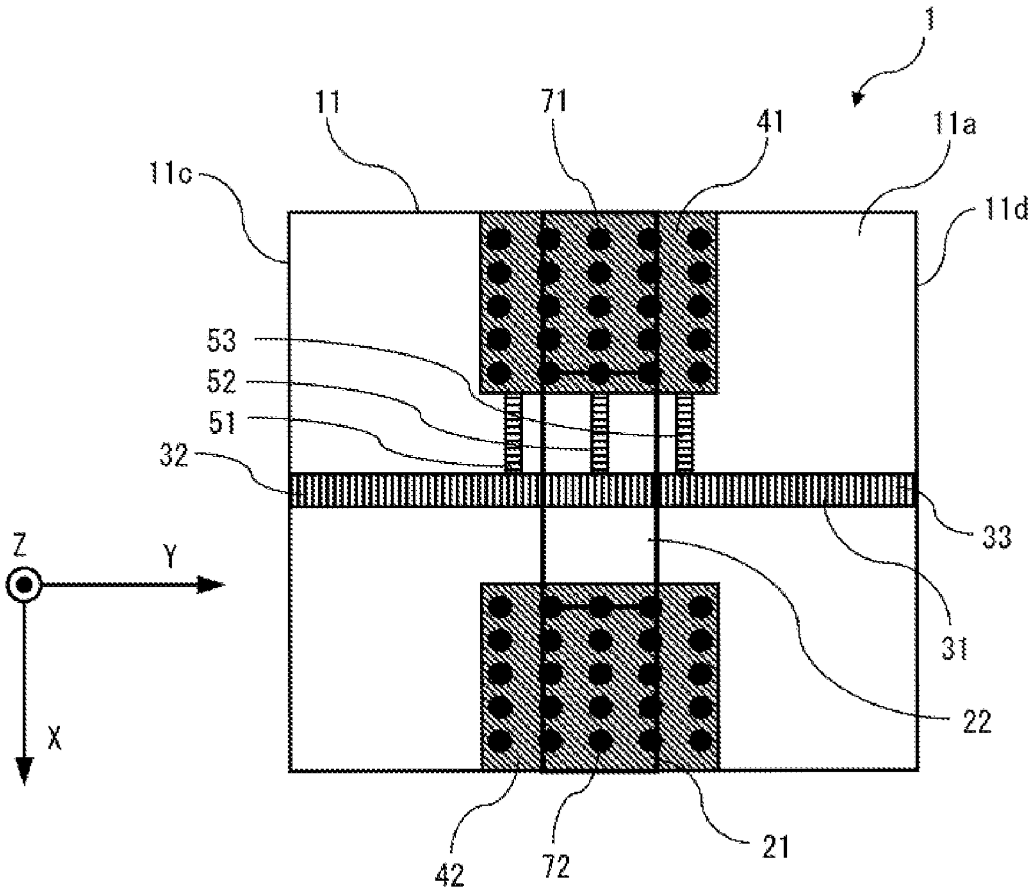
FIG. 3 is a top view schematically showing the feeder line according to embodiment 1.
Figure 4:
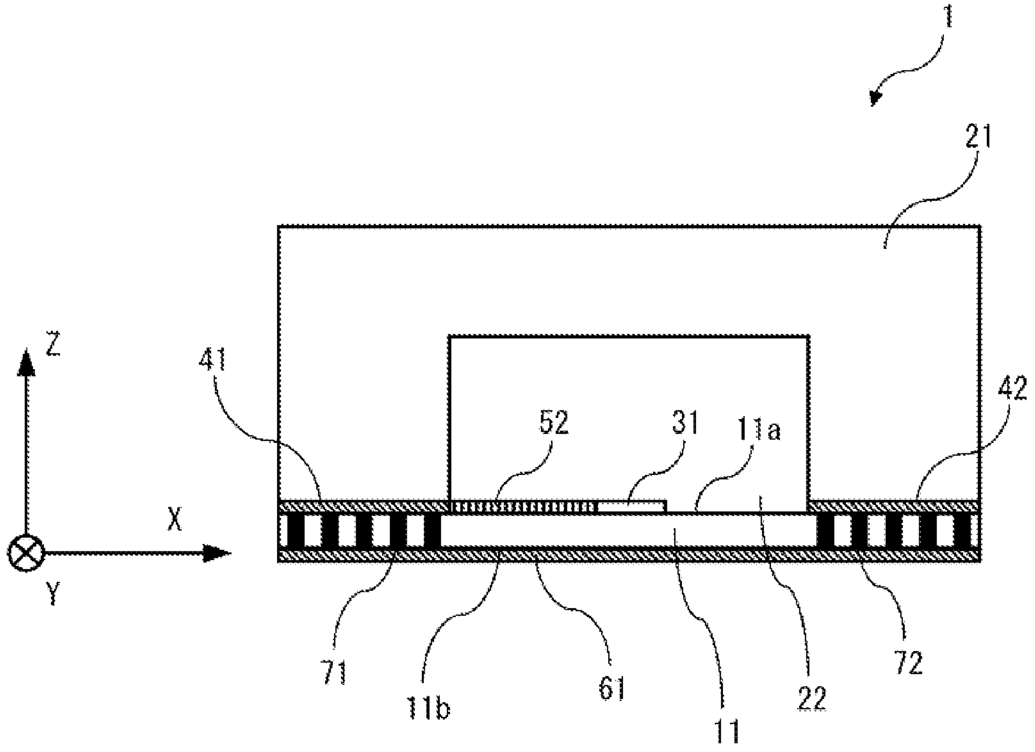
FIG. 4 is a specific-part sectional view of the feeder line taken at an A-A cross-section position in FIG. 1.
Figure 5:
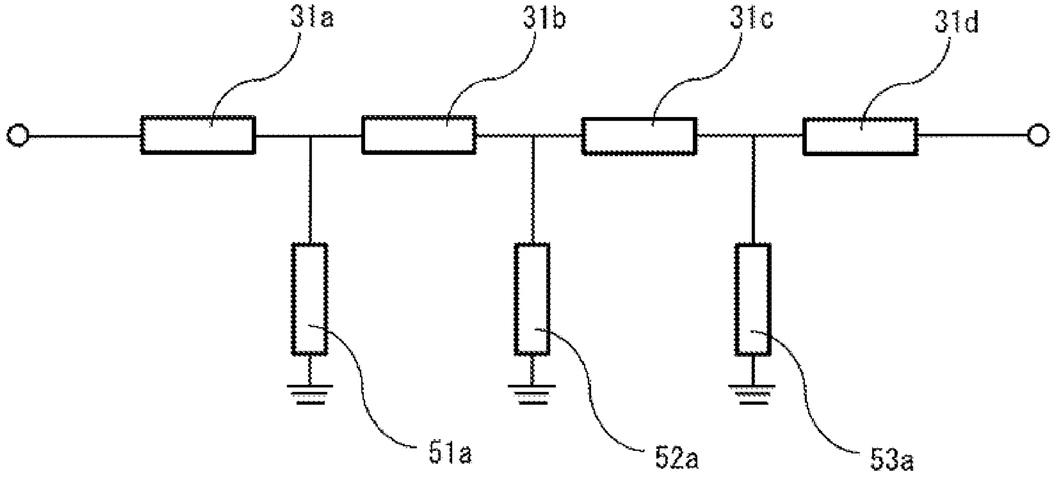
FIG. 5 shows an equivalent circuit of the feeder line according to embodiment 1.
Figure 6:
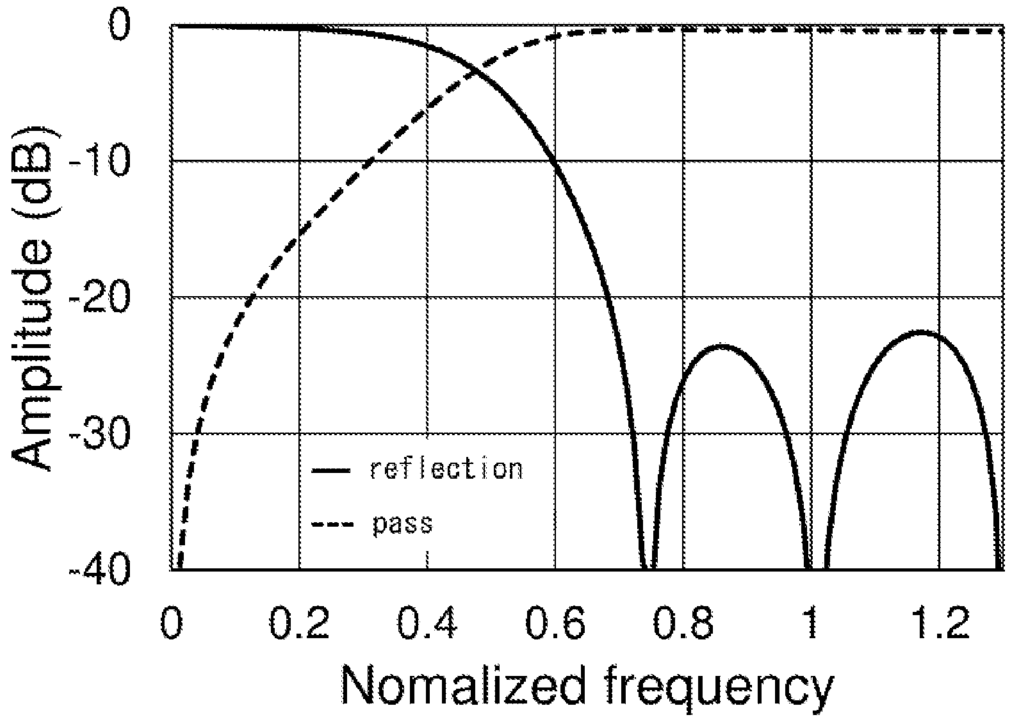
FIG. 6 shows transmission line characteristics of the feeder line according to embodiment 1.
Figure 7:
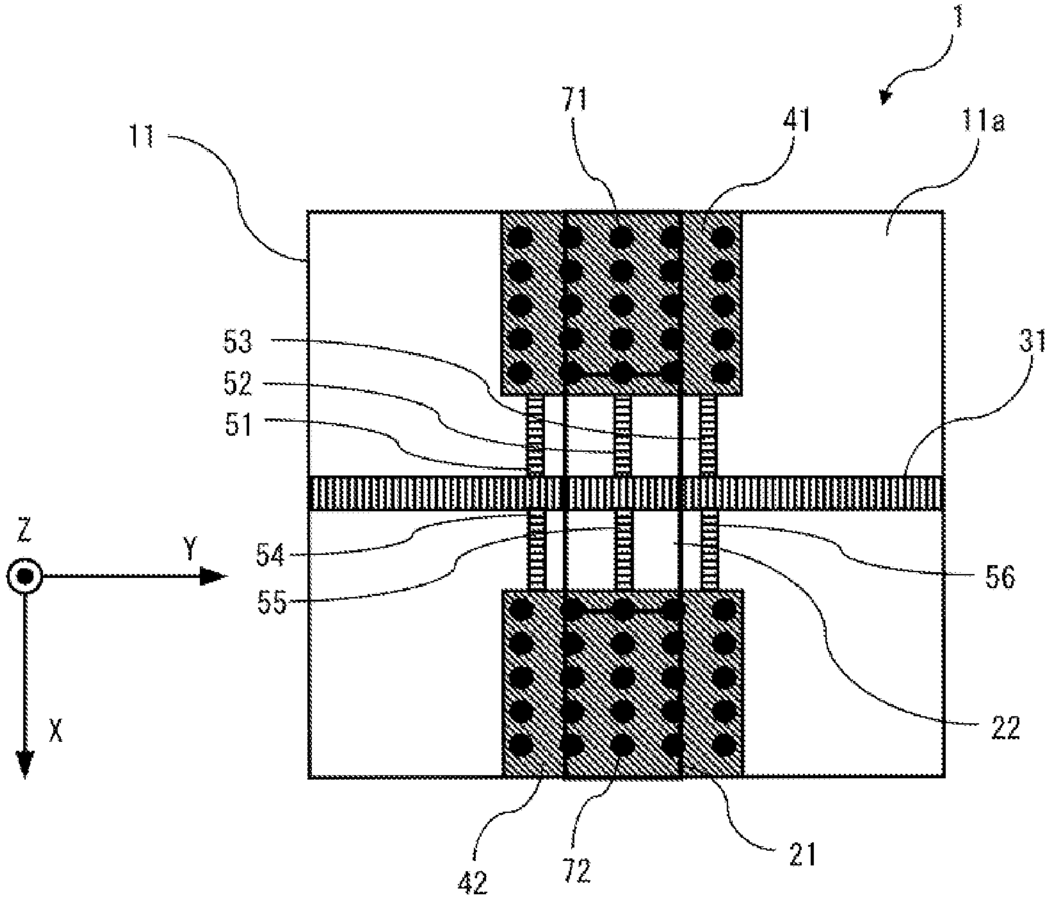
FIG. 7 is a top view schematically showing another feeder line according to embodiment 1.
Figure 8:
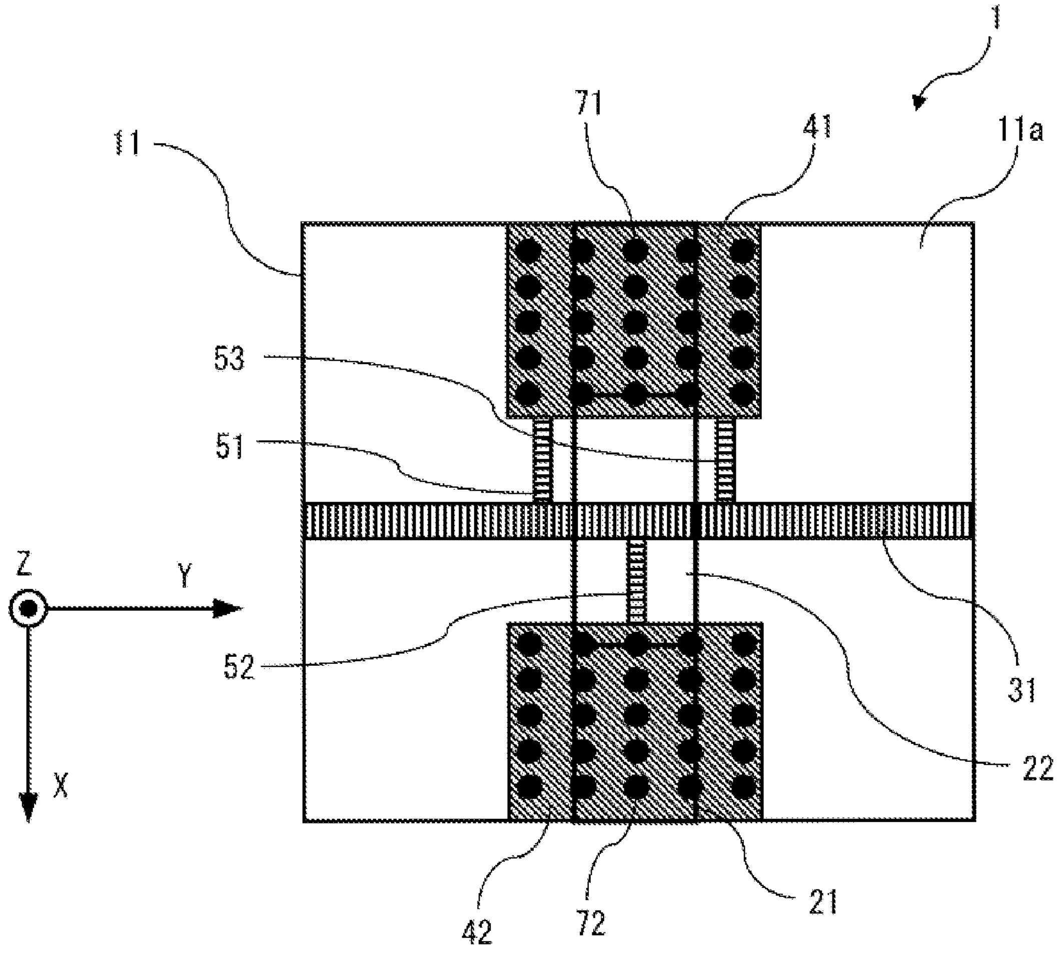
FIG. 8 is a top view schematically showing another feeder line according to embodiment 1.
Figure 9:
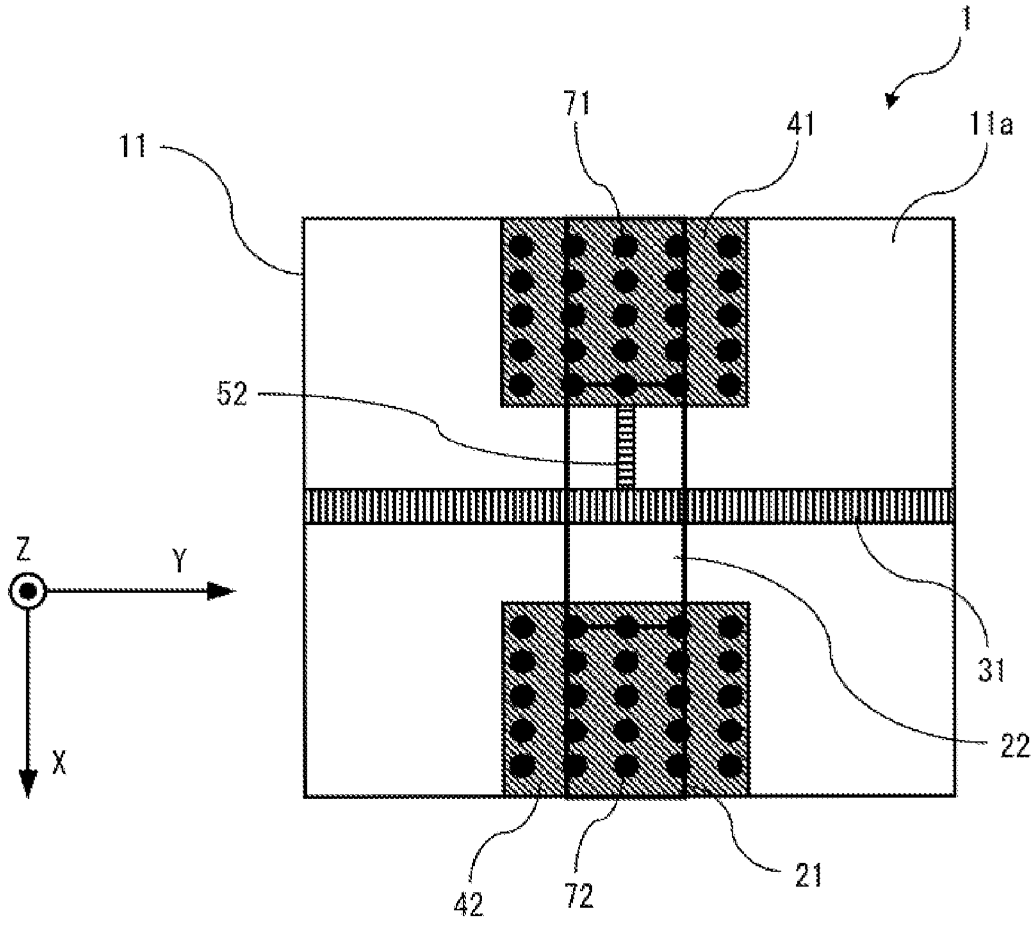
FIG. 9 is a top view schematically showing another feeder line according to embodiment 1.
Figure 10:
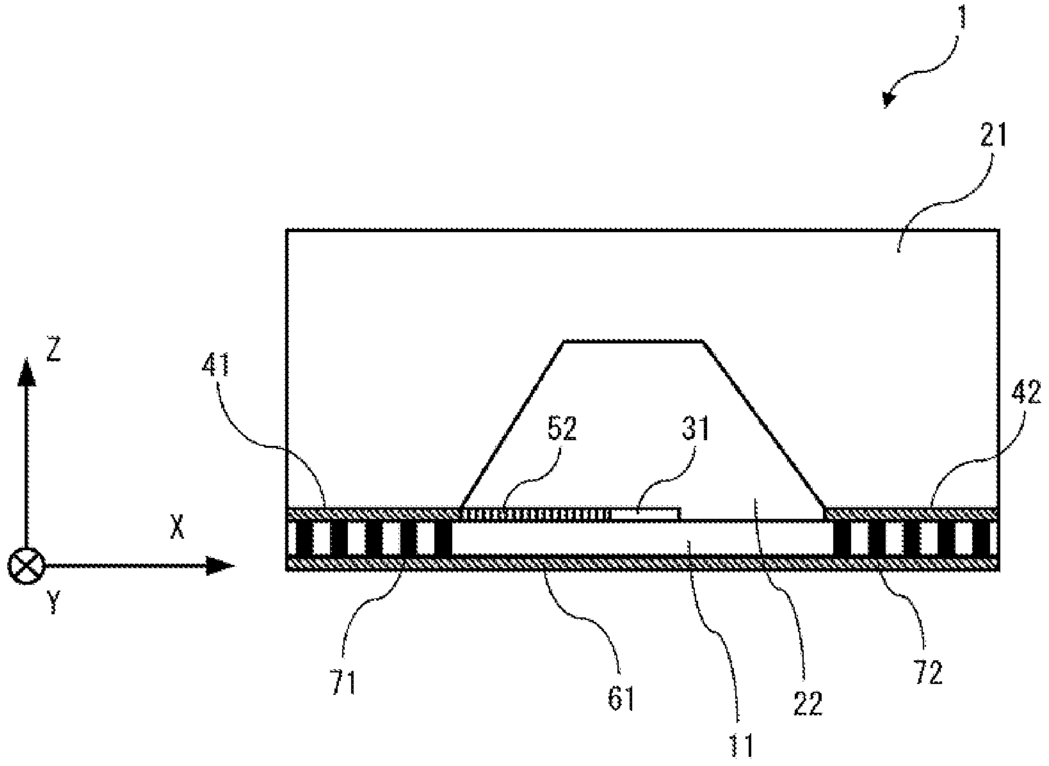
FIG. 10 is a specific-part sectional view of another feeder line according to embodiment 1.
Figure 11:
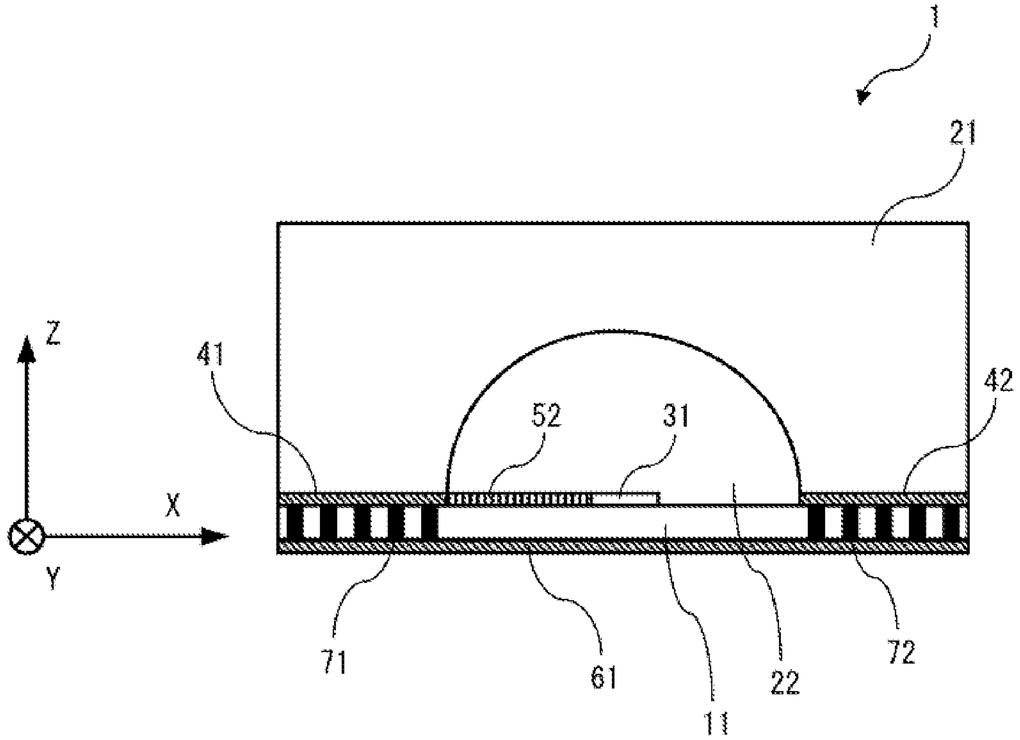
FIG. 11 is a specific-part sectional view of another feeder line according to embodiment 1.
Figure 12:
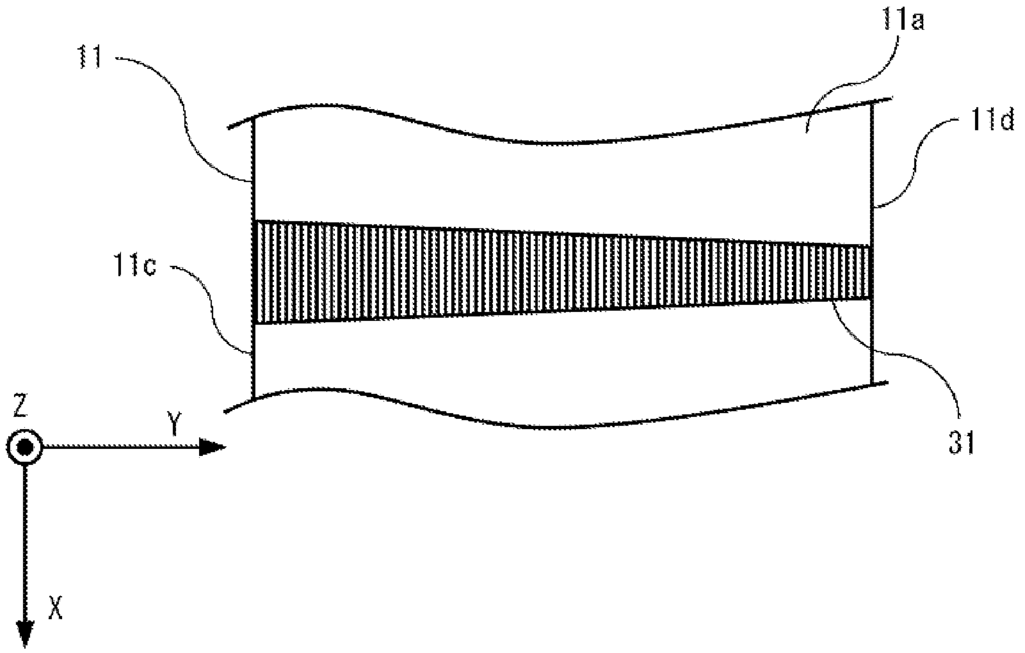
FIG. 12 is a specific-part top view schematically showing another feeder line according to embodiment 1.

FIG. 1 is a perspective view schematically showing a feeder line 1 according to embodiment 1, FIG. 2 is a schematic view schematically showing an antenna device 100 using the feeder line 1, FIG. 3 is a top view schematically showing the feeder line 1, FIG. 4 is a sectional view of the feeder line 1 taken at an A-A cross-section position in FIG. 1, FIG. 5 shows an equivalent circuit of the feeder line 1 according to embodiment 1, FIG. 6 shows an electromagnetic field analysis result of transmission line characteristics of the feeder line 1 according to embodiment 1, FIG. 7 is a top view schematically showing another feeder line 1 according to embodiment 1, FIG. 8 is a top view schematically showing another feeder line 1 according to embodiment 1, FIG. 9 is a top view schematically showing another feeder line 1 according to embodiment 1, FIG. 10 is a sectional view of another feeder line 1 according to embodiment 1, FIG. 11 is a sectional view of another feeder line 1 according to embodiment 1, and FIG. 12 is a specific-part top view schematically showing another feeder line 1 according to embodiment 1. In the drawings, a conductive member 21 is shown by only lines indicating the outer shape. FIG. 10 and FIG. 11 are sectional views of other feeder lines 1 taken at a position equivalent to the A-A cross-section position in FIG. 1. The antenna device 100 using the feeder line 1 is a device that transmits a microwave band or millimeter-wave band high-frequency signal. The microwave has a wavelength of 1 mm to 1 m and a frequency of 300 MHz to 300 GHz. The millimeter wave has a wavelength of 1 mm to 10 mm and a frequency of 30 GHz to 300 GHz.

<Antenna Device 100>

As shown in FIG. 2, the antenna device 100 includes the feeder line 1, a high-frequency signal generator 2, and an antenna 3. The high-frequency signal generator 2 which generates a high-frequency signal is provided as an integrated circuit (IC), for example. The feeder line 1 connects the high-frequency signal generator 2 and the antenna 3. The high-frequency signal generator 2 is placed at a dielectric substrate 11 and the antenna 3 is formed at the dielectric substrate 11. The high-frequency signal generator 2 is connected to one input/output end 32 of a first conductor pattern 31 included in the feeder line 1. The antenna 3 is connected to another input/output end 33 of the first conductor pattern 31 included in the feeder line 1.

<Feeder Line 1>

The feeder line 1 of the present disclosure is a feeder line that can suppress noise propagating through the first conductor pattern 31 formed on the dielectric substrate 11, thus having high noise immunity. As shown in FIG. 1, the feeder line 1 includes: the dielectric substrate 11 formed in a plate shape; the first conductor pattern 31, a first-area ground conductor pattern 41, a second-area ground conductor pattern 42, and second conductor patterns 51, 52, 53, formed on a first surface **11*a* which is a plate surface of the dielectric substrate 11; a second-surface ground conductor pattern 61 formed on a second surface 11*b* of the dielectric substrate 11; conductors (not shown in FIG. 1) penetrating the dielectric substrate 11; and a conductive member 21. X axis, Y axis, and Z axis shown in each drawing are three axes perpendicular to each other. In the present embodiment, the plate-shaped dielectric substrate 11 is placed in parallel to XY plane, and the first conductor pattern 31 extends in parallel to Y axis. A signal propagating through the first conductor pattern 31** propagates in +Y direction. This signal is a microwave band or millimeter-wave band signal.

<Dielectric Substrate 11>

The dielectric substrate 11 is a rectangular planar member made of a resin material, for example. The dielectric substrate 11 is grounded by the first-area ground conductor pattern 41, the second-area ground conductor pattern 42, and the second-surface ground conductor pattern 61 connected to each other. The material of the dielectric substrate 11 is not limited to resin and may be ceramic. The shape of the dielectric substrate 11 is not limited to a rectangular shape, and may be, for example, a shape corresponding to the provided position, or a polygonal shape. In FIG. 1, the dielectric substrate 11 is shown as a single-layer substrate. However, the dielectric substrate 11 may be a multilayer substrate. Since a wide variety of dielectric substrates 11 can be selected, the degree of freedom in designing of the feeder line 1 can be enhanced.

<Conductive Member 21>

The conductive member 21 connects the first-area ground conductor pattern 41 and the second-area ground conductor pattern 42 while straddling the first conductor pattern 31. The conductive member 21 is grounded. The conductive member 21 has a recess 22 at a part straddling the first conductor pattern 31. The conductive member 21 is manufactured by shaping a material such as metal or conductive resin. In the case of manufacturing the conductive member 21 as described above, the conductive member 21 can be easily manufactured. Therefore, productivity of the feeder line 1 can be improved. The shape at the recess 22 of the conductive member 21, in a direction perpendicular to the first surface 11*a* of the dielectric substrate 11, is a rectangular shape, as shown in FIG. 4. Although the recess 22 is provided in a rectangular shape in FIG. 4, the shape of the recess 22 is not limited to a rectangular shape. As shown in FIG. 10 or FIG. 11, the recess 22 may be a trapezoidal shape or a semicircular shape. If the shape of the recess 22 is a rectangular shape, a trapezoidal shape, or a semicircular shape, the recess 22 can be easily formed at the conductive member 21. Therefore, productivity of the feeder line 1 can be improved.

By providing the conductive member 21, electromagnetic interference from outside to the first conductor pattern 31 can be suppressed. In addition, noise propagating through the recess 22 to the inside of the conductive member 21 can be suppressed. Placement of the conductive member 21 which is a shield is not limited to such placement as to only straddle the first conductor pattern 31 as shown in FIG. 1, and the conductive member 21 is placed so as to cover the high-frequency signal generator 2. In the case where the conductive member 21 is placed so as to cover the high-frequency signal generator 2, the high-frequency signal generator 2 can be prevented from becoming an electromagnetic disturbance source. In addition, electromagnetic interference from outside to the high-frequency signal generator 2 can be suppressed.

<Configurations of Conductor Patterns>

The configurations of the conductor patterns which are a major part of the present disclosure will be described. As shown in FIG. 3, the first conductor pattern 31 is formed on the first surface 11*a* of the dielectric substrate 11. The first conductor pattern 31 extends from a first end surface 11*c* side of the dielectric substrate 11 to a second end surface 11*d* side opposite to the first end surface 11*c* so as to divide the first surface 11*a* of the dielectric substrate 11 into a first area and a second area. An end on the first end surface 11*c* side and an end on the second end surface 11*d* side of the first conductor pattern 31 serve as the signal input/output ends 32, 33.

The first-area ground conductor pattern 41 is formed in the first area divided by the first conductor pattern 31 on the first surface 11*a* of the dielectric substrate 11. The second-area ground conductor pattern 42 is formed in the second area divided by the first conductor pattern 31 on the first surface 11*a* of the dielectric substrate 11. As shown in FIG. 4, the second-surface ground conductor pattern 61 is formed on the second surface 11*b* on a side opposite to the first surface 11*a* of the dielectric substrate 11. The second-surface ground conductor pattern 61 is formed over the entire second surface lib.

As shown in FIG. 4, a plurality of conductors 71, 72 are through holes penetrating the dielectric substrate 11 and connecting between the second-surface ground conductor pattern 61, and the first-area ground conductor pattern 41 and the second-area ground conductor pattern 42. In FIG. 3, the plurality of conductors 71, 72 are placed symmetrically with respect to X direction in which the second conductor pattern 52 extends. However, placement of the conductors 71, 72 is not limited thereto and the conductors 71, 72 may be placed asymmetrically with respect to X direction in which the second conductor pattern 52 extends. In FIG. 3, the conductors 71, 72 are placed regularly in X direction and Y direction. However, without limitation thereto, they may be placed in a partially disordered irregular manner.

At least one second conductor pattern is provided, and the second conductor pattern is formed on the first surface 11*a* of the dielectric substrate 11 and connects the first conductor pattern 31 and one or both of the first-area ground conductor pattern 41 and the second-area ground conductor pattern 42. In the present embodiment, as shown in FIG. 3, the feeder line 1 includes a plurality of second conductor patterns 51, 52, 53, and the second conductor patterns 51, 52, 53 connect the first-area ground conductor pattern 41 and the first conductor pattern 31. The second conductor patterns 51, 52, 53 are placed so as to be arranged in the direction in which the first conductor pattern 31 extends, from the first end surface 11*c* side toward the second end surface 11*d* side of the dielectric substrate 11. The length of each of the second conductor patterns 51, 52, 53 is ¼ of the wavelength of the signal propagating through the first conductor pattern 31. The interval of parts where the second conductor patterns 51, 52, 53 and the first conductor pattern 31 are connected to each other is ¼ of the wavelength of the signal propagating through the first conductor pattern 31.

<Operations of Conductor Patterns>

Operations of the conductor patterns formed on the dielectric substrate 11 will be described. FIG. 5 shows an equivalent circuit of the first conductor pattern 31 and the second conductor patterns 51, 52, 53 included in the feeder line 1. Rectangular parts shown in FIG. 5 are equivalent circuit parts and are ideal feeder line parts each having a length that is ¼ of the wavelength of the signal propagating through the first conductor pattern 31. The first conductor pattern 31 can be replaced with equivalent circuit parts 31*a*, 31*b*, 31*c*, 31*d* of the first conductor pattern 31. The second conductor patterns 51, 52, 53 can be replaced with equivalent circuit parts 51*a*, 52*a*, 53*a*, respectively. As described above, the second conductor patterns 51, 52, 53 each having a length that is ¼ of the wavelength of the signal propagating through the first conductor pattern 31 are placed at an interval that is ¼ of the wavelength of the signal propagating through the first conductor pattern 31, whereby a band-pass filter is formed.

Since the second conductor patterns 51, 52, 53 are electrically connected to the second-surface ground conductor pattern 61 via the conductors 71 and the first-area ground conductor pattern 41, the second conductor patterns 51, 52, 53 can be considered to be a short stub and thus a band-pass filter is formed. In a case where the signal propagating through the first conductor pattern 31 is a signal having a pass frequency, the second conductor patterns 51, 52, 53 serve as a short stub, i.e., an open circuit, and therefore the signal propagates in +Y direction. On the other hand, in a case of a signal (noise) having a frequency other than the pass frequency, the signal is reflected at the positions of the second conductor patterns 51, 52, 53 and therefore the signal does not propagate in +Y direction.

Effectiveness of operations of the conductor patterns will be described using, as an example, reflection characteristics and pass characteristics obtained through electromagnetic field analysis shown in FIG. 6. In FIG. 6, the horizontal axis indicates a normalized frequency and the vertical axis indicates the amplitude values for reflection and pass. The amplitude value for reflection is not higher than −20 dB in a range not less than a bandwidth of 60% with respect to a normalized frequency "1", and the amplitude value for pass is not higher than −30 dB in a range not higher than a normalized frequency "0.1". Thus, preferable signal propagation characteristics are achieved. This indicates that a signal having the pass frequency propagates without being reflected and a signal having a frequency other than the pass frequency does not propagate. The effectiveness of operations of the conductor patterns applies also to the other embodiments described later, as well as embodiment 1.

Here, the length of each of the second conductor patterns 51, 52, 53 is ¼ of the wavelength of the signal propagating through the first conductor pattern 31, and the interval of the parts where the second conductor patterns 51, 52, 53 and the first conductor pattern 31 are connected to each other is ¼ of the wavelength of the signal propagating through the first conductor pattern 31. In this case, most effective signal propagation characteristics as described above can be obtained. Also in a case where the length of each of the second conductor patterns 51, 52, 53 is ¼ of the wavelength of the signal propagating through the first conductor pattern 31 and the interval of the parts where the second conductor patterns 51, 52, 53 and the first conductor pattern 31 are connected to each other is not ¼ of the wavelength of the signal propagating through the first conductor pattern 31, effective signal propagation characteristics can be obtained. In this case, the bandwidth in which the amplitude value for reflection is not higher than −20 dB with respect to the normalized frequency "1" is narrowed, but the range not higher than the normalized frequency "0.1", in which the amplitude value for pass is not higher than −30 dB, is maintained. In a case of not providing the second conductor patterns 51, 52, 53, characteristics in which the signal propagating through the first conductor pattern 31 is not reflected over the entire frequency band, are obtained.

<Formation of Conductor Patterns>

A method for forming the conductor patterns on the dielectric substrate 11 will be described. The first conductor pattern 31, the second conductor patterns 51, 52, 53, the first-area ground conductor pattern 41, and the second-area ground conductor pattern 42 formed on the first surface 11*a* of the dielectric substrate 11 are, for example, copper foils which are conductive metal foils. First, a copper foil is provided by compression bonding on the entire first surface 11*a* of a dielectric body which is a substrate body of the dielectric substrate 11. Then, the copper foil provided on the first surface 11*a* is patterned, whereby the conductor patterns are formed on the dielectric substrate 11. The conductor patterns provided to the first surface 11*a* are not limited to copper foils and may be metal plates. In a case of forming the conductor patterns by metal plates, first, metal plates are worked into the shapes of the first conductor pattern 31, the second conductor patterns 51, 52, 53, the first-area ground conductor pattern 41, and the second-area ground conductor pattern 42. Then, the conductor patterns are attached to the first surface 11*a* of the dielectric substrate 11, whereby the conductor patterns are formed on the dielectric substrate 11.

The second-surface ground conductor pattern 61 formed on the second surface 11*b* of the dielectric substrate 11 is, for example, a copper foil which is a conductive metal foil. A copper foil is provided by compression bonding on the entire second surface 11*b* of the dielectric body which is the substrate body of the dielectric substrate 11. The second-surface ground conductor pattern 61 provided to the second surface 11*b* is not limited to a copper foil, and may be a metal plate. First, a metal plate is worked into the shape of the second-surface ground conductor pattern 61. Then, the second-surface ground conductor pattern 61 is attached to the second surface 11*b* of the dielectric substrate 11.

The first conductor pattern 31 formed on the dielectric substrate 11 is configured as a microstrip line. The configuration of the conductor pattern is not limited to a microstrip line, and the conductor pattern may be configured as a conductor pattern including a coplanar line with a ground conductor. In a case of configuring the conductor pattern as a microstrip line or a coplanar line with a ground conductor, noise propagating through the first conductor pattern 31 can be effectively suppressed.

The first conductor pattern 31 and the second conductor patterns 51, 52, 53 are each formed so as to have a constant width along their respective signal propagating directions on the first surface 11*a* of the dielectric substrate 11, as shown in FIG. 3. The width of each of the first conductor pattern 31 and the second conductor patterns 51, 52, 53 is not limited to a constant width, and they may be each formed so as to have a varying width along their respective signal propagating directions on the first surface 11*a* of the dielectric substrate 11. FIG. 12 shows an example of the first conductor pattern 31 formed so as to have a varying width along the signal propagating direction on the first surface 11*a* of the dielectric substrate 11. In a case where the first conductor pattern 31 and the second conductor patterns 51, 52, 53 are each formed so as to have a constant width, designing of each conductor pattern can be easily performed. In a case where the first conductor pattern 31 and the second conductor patterns 51, 52, 53 are each formed so as to have a varying width, designing parameters can be added. With the designing parameters added, preferable reflection characteristics and pass characteristics for signals can be obtained.

In the present embodiment, one first conductor pattern 31 is provided between the first-area ground conductor pattern 41 and the second-area ground conductor pattern 42. The number of first conductor patterns 31 is not limited to one, and a plurality of first conductor patterns 31 may be provided between the first-area ground conductor pattern 41 and the second-area ground conductor pattern 42.

In the present embodiment, the second conductor patterns 51, 52, 53 connect the first conductor pattern 31 and the first-area ground conductor pattern 41 in the first area, and are placed only between these. As shown in FIG. 7 or FIG.

8, the second conductor patterns 51, 52, 53 may be placed between the first conductor pattern 31 and both of the first-area ground conductor pattern 41 and the second-area ground conductor pattern 42 so as to connect the first conductor pattern 31 and both of the first-area ground conductor pattern 41 and the second-area ground conductor pattern 42. In the present embodiment, three second conductor patterns are provided as the second conductor patterns 51, 52, 53. However, the number of second conductor patterns is not limited thereto, and as shown in FIG. 9, one second conductor pattern may be provided. The noise suppression amount changes in accordance with the number of second conductor patterns. In a case of providing a plurality of second conductor patterns, the noise suppression amount can be more increased. The number of second conductor patterns may be selected in accordance with a desired noise suppression amount.

In the present embodiment, the length of each of the second conductor patterns 51, 52, 53 is ¼ of the wavelength of the signal propagating through the first conductor pattern 31. The length of each of the second conductor patterns 51, 52, 53 may be an odd multiple of ¼ of the wavelength of the signal propagating through the first conductor pattern 31. As shown in FIG. 3, the second conductor patterns 51, 52, 53 are formed to be straight conductor patterns. However, the second conductor patterns 51, 52, 53 may be formed in a conductor pattern shape having a bent portion not being straight, if the length thereof is an odd multiple of ¼ of the wavelength of the signal propagating through the first conductor pattern 31. In the present embodiment, the interval of the parts where the second conductor patterns 51, 52, 53 and the first conductor pattern 31 are connected to each other is ¼ of the wavelength of the signal propagating through the first conductor pattern 31. The interval of the parts where the second conductor patterns 51, 52, 53 and the first conductor pattern 31 are connected to each other may be an integer multiple of ¼ of the wavelength of the signal propagating through the first conductor pattern 31. Since a wide variety of values can be selected for the length of each second conductor pattern and the placement interval of the second conductor patterns, the degree of freedom in designing of the feeder line 1 can be improved.

As described above, the feeder line 1 according to embodiment 1 has the second conductor patterns 51, 52, 53 connecting the first conductor pattern 31 having the signal input/output ends at the ends thereof and the first-area ground conductor pattern 41 to be grounded, and the length of each of the second conductor patterns 51, 52, 53 is ¼ of the wavelength of the signal propagating through the first conductor pattern 31. Therefore, a signal having the pass frequency propagates without being reflected, and a signal having a frequency other than the pass frequency, i.e., noise, does not propagate. Thus, noise propagating through the first conductor pattern 31 formed on the dielectric substrate 11 can be suppressed, whereby the feeder line 1 having high noise immunity can be obtained. In addition, in a case where the interval of the parts where the second conductor patterns 51, 52, 53 and the first conductor pattern 31 are connected to each other is ¼ of the wavelength of the signal propagating through the first conductor pattern 31, more effective signal propagation characteristics that a signal having a frequency other than the pass frequency, i.e., noise, is even less likely to propagate, can be obtained. In addition, in a case where the signal propagating through the first conductor pattern 31 is a microwave band or millimeter-wave band signal, effective signal propagation characteristics can be obtained.

In addition, in a case where the first conductor pattern 31 is a microstrip line or a coplanar line with a ground conductor, noise propagating through the first conductor pattern 31 can be effectively suppressed. In addition, in a case where the conductive member 21 is metal or conductive resin, the conductive member 21 can be easily manufactured and thus productivity of the feeder line 1 can be improved. In addition, in a case where the shape of the recess 22 of the conductive member 21 is a rectangular shape, a trapezoidal shape, or a semicircular shape, the recess 22 can be easily formed at the conductive member 21 and thus productivity of the feeder line 1 can be improved. In addition, in a case where the first conductor pattern 31 and the second conductor patterns 51, 52, 53 are each formed so as to have a constant width along their respective signal propagating directions on the first surface 11*a* of the dielectric substrate 11, designing of each conductor pattern can be easily performed. In addition, in a case where the first conductor pattern 31 and the second conductor patterns 51, 52, 53 are each formed so as to have a varying width along their respective signal propagating directions on the first surface 11*a* of the dielectric substrate 11, designing parameters can be added and thus preferable reflection characteristics and pass characteristics for signals can be obtained.

In addition, the antenna device 100 according to embodiment 1 includes: the feeder line 1 which has the second conductor patterns 51, 52, 53 connecting the first conductor pattern 31 having the signal input/output ends at the ends thereof and the first-area ground conductor pattern 41 to be grounded, and in which the length of each of the second conductor patterns 51, 52, 53 is ¼ of the wavelength of the signal propagating through the first conductor pattern 31; the high-frequency signal generator 2 connected to one input/output end 32 of the first conductor pattern 31 included in the feeder line 1; and the antenna 3 connected to the other input/output end 33 of the first conductor pattern 31 included in the feeder line 1. Therefore, a signal having the pass frequency propagates through the feeder line 1 without being reflected, and a signal having a frequency other than the pass frequency, i.e., noise, does not propagate through the feeder line 1. Thus, it is possible to obtain the antenna device 100 in which the high-frequency signal generator 2 normally operates without being influenced by noise.

Embodiment 2

Figure 13:
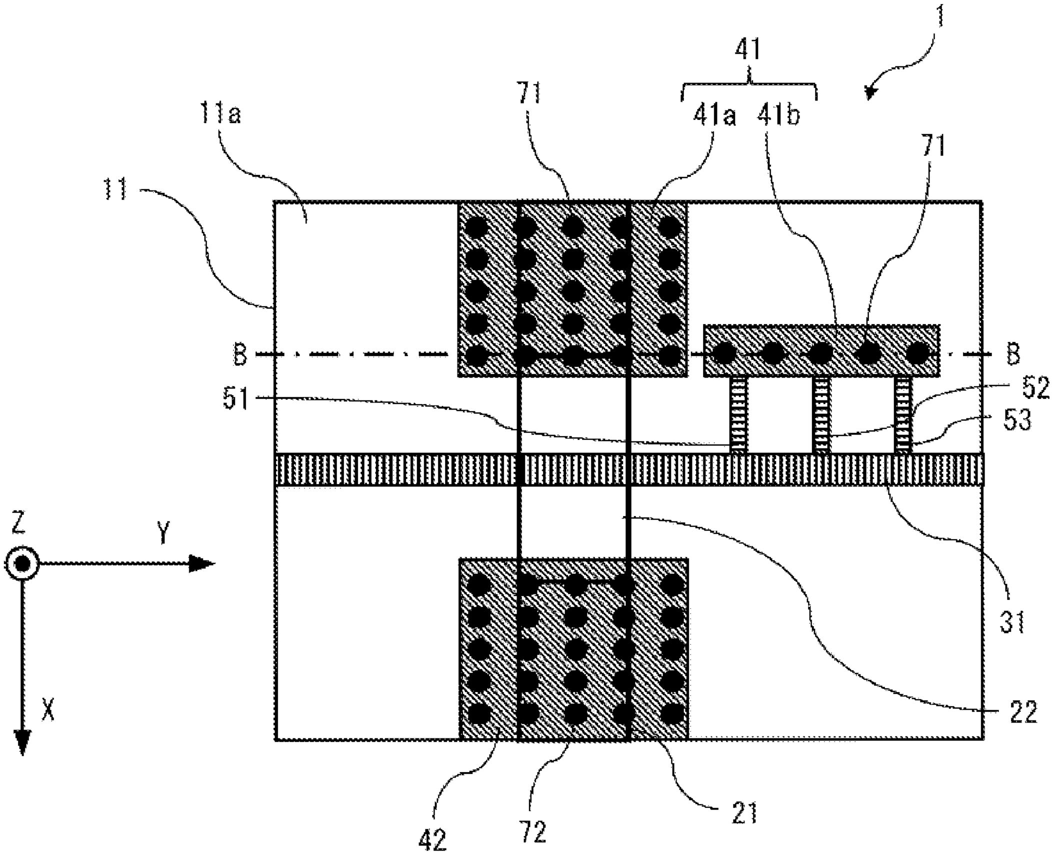
FIG. 13 is a top view schematically showing a feeder line according to embodiment 2.
Figure 14:
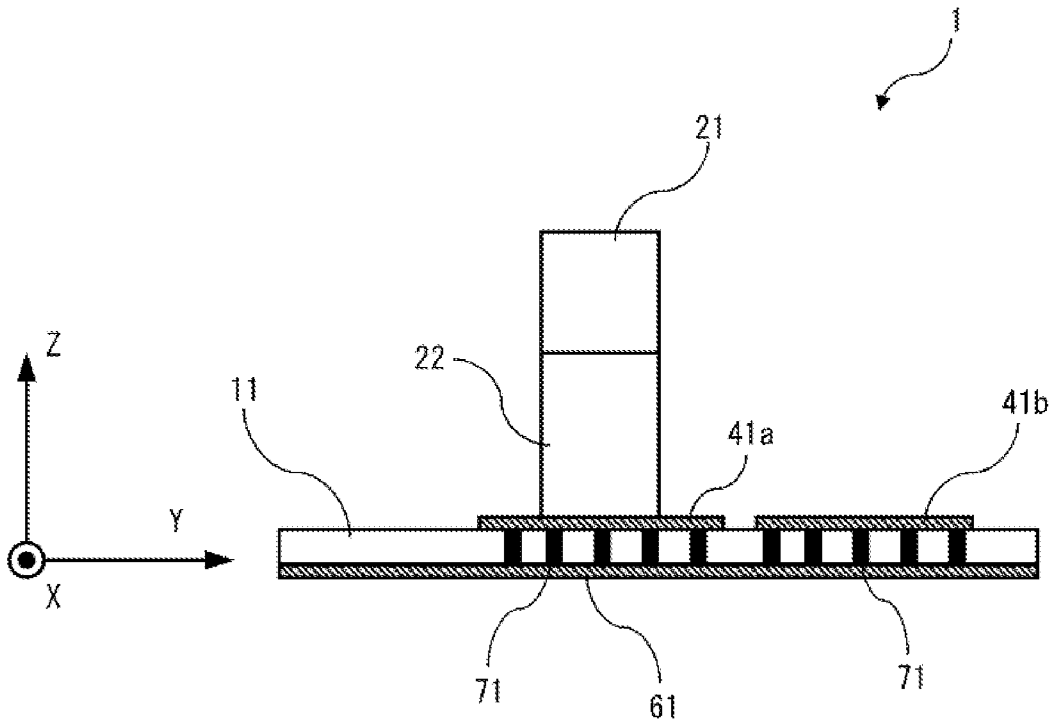
FIG. 14 is a specific-part sectional view of the feeder line taken at a B-B cross-section position in FIG. 13.
Figure 15:
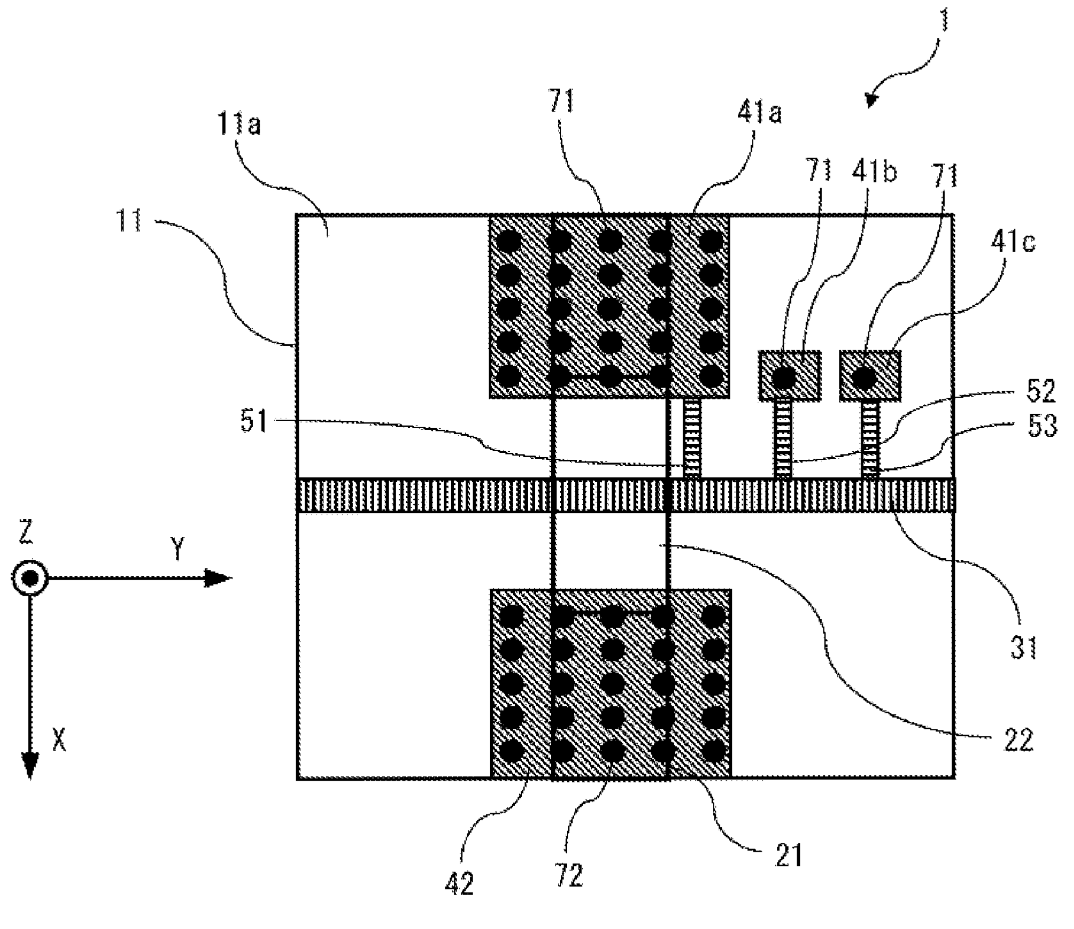
FIG. 15 is a top view schematically showing another feeder line according to embodiment 2.

A feeder line 1 according to embodiment 2 will be described. FIG. 13 is a top view schematically showing the feeder line 1 according to embodiment 2, FIG. 14 is a specific-part sectional view of the feeder line 1 taken at a B-B cross-section position in FIG. 13, and FIG. 15 is a top view schematically showing another feeder line 1 according to embodiment 2. In the drawings, the conductive member 21 is shown by only lines indicating the outer shape. The feeder line 1 according to embodiment 2 is configured to include a plurality of first-area ground conductor patterns 41.

The feeder line 1 includes a plurality of the first-area ground conductor patterns 41 and/or a plurality of the second-area ground conductor patterns 42 on the first surface 11*a* of the dielectric substrate 11. In the present embodiment, as shown in FIG. 13, the feeder line 1 includes a plurality of first-area ground conductor patterns 41*a*, 41*b*. The conductive member 21 connects the first-area ground conductor pattern 41*a* and the second-area ground conductor pattern 42 while straddling the first conductor pattern 31. As shown in FIG. 14, a plurality of conductors 71 penetrate the dielectric substrate 11 and connect between the first-area ground conductor patterns 41*a*, 41*b* and the second-surface ground conductor pattern 61. The feeder line 1 includes a plurality of second conductor patterns 51, 52, 53, and the second conductor patterns 51, 52, 53 connect the first-area ground conductor pattern 41*b* and the first conductor pattern 31. By this configuration, the second conductor patterns 51, 52, 53 are connected to the first-area ground conductor pattern 41*a* via the first-area ground conductor pattern 41*b*, the conductors 71, and the second-surface ground conductor pattern 61. With this configuration, the degree of freedom in placement of the second conductor patterns on the dielectric substrate 11 is enhanced, whereby the degree of freedom in designing of the feeder line 1 can be enhanced.

In FIG. 13, the second conductor patterns 51, 52, 53 are connected to only the first-area ground conductor pattern 41*b*, of the plurality of first-area ground conductor patterns 41*a*, 41*b*. The number of first-area ground conductor patterns 41 to which the second conductor patterns 51, 52, 53 are connected is not limited to one. As shown in FIG. 15, the feeder line 1 may include a plurality of first-area ground conductor patterns 41*a*, 41*b*, 41*c*, and the second conductor patterns 51, 52, 53 may be connected to the plurality of first-area ground conductor patterns 41*a*, 41*b*, 41*c*, respectively. In addition, the feeder line 1 may include a plurality of second-area ground conductor patterns 42, and the second conductor patterns 51, 52, 53 may be connected to the plurality of second-area ground conductor patterns 42.

As described above, the feeder line 1 according to embodiment 2 includes a plurality of the first-area ground conductor patterns 41 and/or a plurality of the second-area ground conductor patterns 42 on the first surface 11*a* of the dielectric substrate 11. Thus, the degree of freedom in placement of the second conductor patterns on the dielectric substrate 11 is enhanced, whereby the degree of freedom in designing of the feeder line 1 can be enhanced.

Embodiment 3

Figure 16:
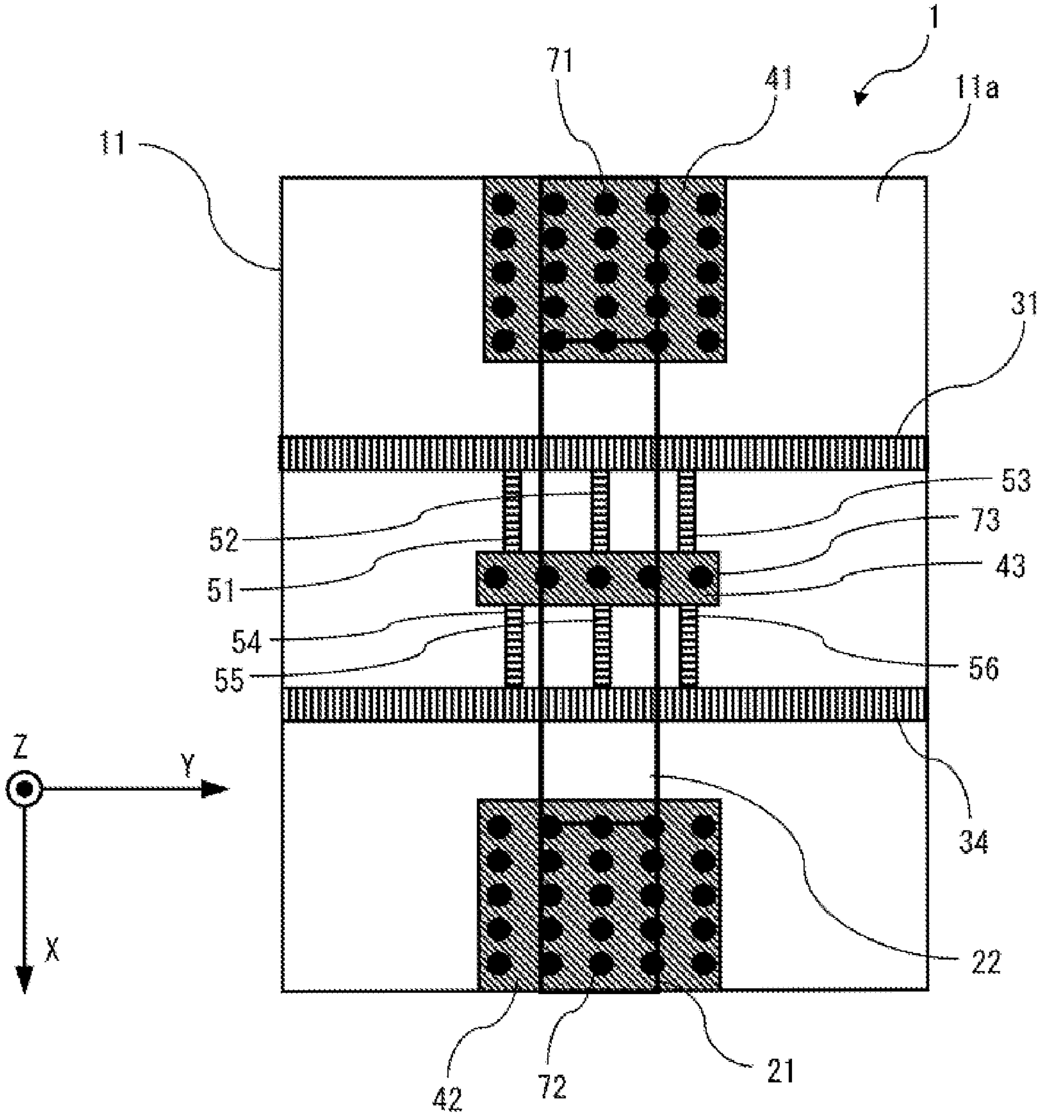
FIG. 16 is a top view schematically showing a feeder line according to embodiment 3.

A feeder line 1 according to embodiment 3 will be described. FIG. 16 is a top view schematically showing the feeder line 1 according to embodiment 3. In the drawing, the conductive member 21 is shown by only lines indicating the outer shape. The feeder line 1 according to embodiment 3 is configured to include a third-area ground conductor pattern 43.

The feeder line 1 includes two first conductor patterns 31, 34, and the third-area ground conductor pattern 43 formed in a third area between the two first conductor patterns 31, 34. The feeder line 1 includes the second conductor patterns 51, 52, 53 connecting the third-area ground conductor pattern 43 and the first conductor pattern 31, and second conductor patterns 54, 55, 56 connecting the third-area ground conductor pattern 43 and the first conductor pattern 34. A plurality of conductors 73 penetrate the dielectric substrate 11 and connect between the third-area ground conductor pattern 43 and the second-surface ground conductor pattern 61 (not shown in FIG. 16). By this configuration, the second conductor patterns 51, 52, 53 are connected to the first-area ground conductor pattern 41 via the third-area ground conductor pattern 43, the conductors 71, 73, and the second-surface ground conductor pattern 61, and the second conductor patterns 54, 55, 56 are connected to the second-area ground conductor pattern 42 via the third-area ground conductor pattern 43, the conductors 72, 73, and the second-surface ground conductor pattern 61.

As described above, the feeder line 1 according to embodiment 3 includes two first conductor patterns 31, 34, the third-area ground conductor pattern 43 formed in the third area between the two first conductor patterns 31, 34, the second conductor patterns 51, 52, 53, 54, 55, 56 connecting the third-area ground conductor pattern 43 and the first conductor patterns 31, 34, and the plurality of conductors 73 connecting between the third-area ground conductor pattern 43 and the second-surface ground conductor pattern 61. Thus, noise propagating through the two first conductor patterns 31, 34 formed on the dielectric substrate 11 can be suppressed while isolation between the first conductor patterns 31, 34 can be improved.

Embodiment 4

Figure 17:
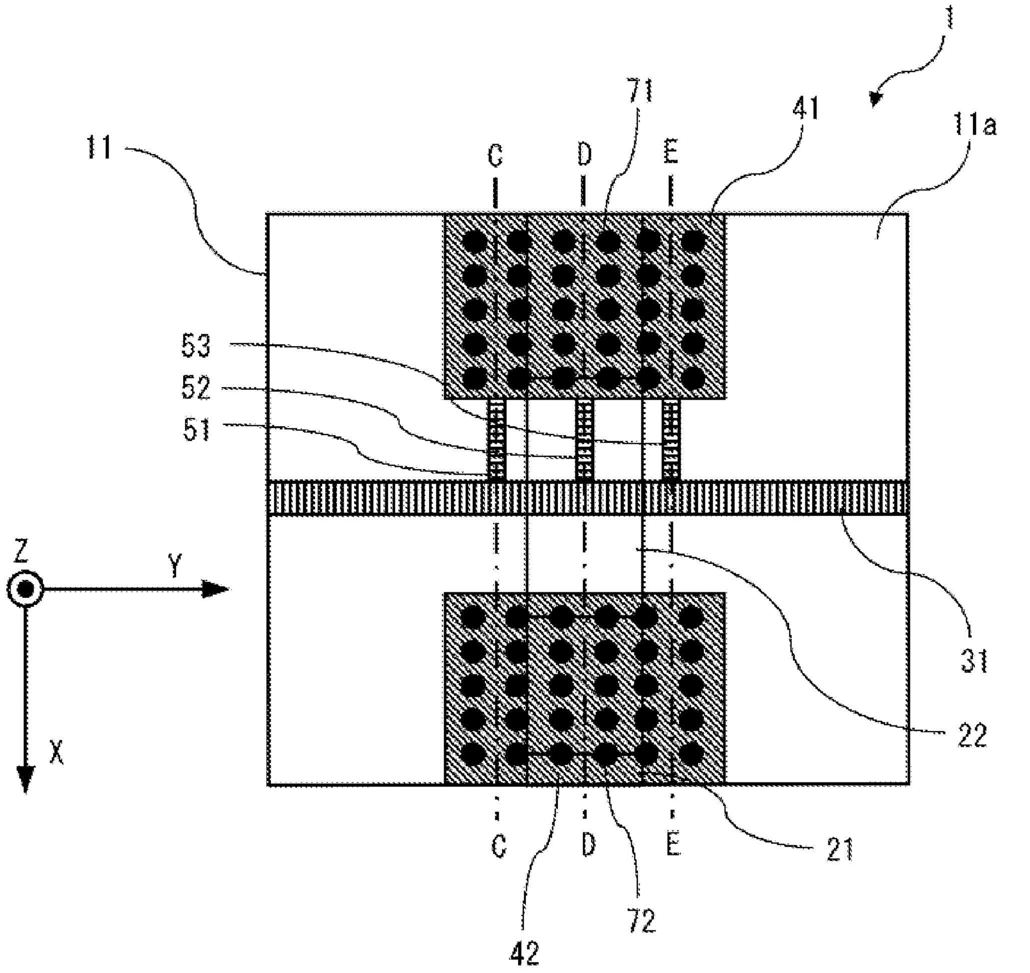
FIG. 17 is a top view schematically showing a feeder line according to embodiment 4.

A feeder line 1 according to embodiment 4 will be described. FIG. 17 is a top view schematically showing the feeder line 1 according to embodiment 4. In the drawing, the conductive member 21 is shown by only lines indicating the outer shape. The feeder line 1 according to embodiment 4 is configured to include the conductors 71, 72 placed differently from those in embodiment 1.

In embodiment 1, as shown in FIG. 3, the plurality of conductors 71, 72 are placed symmetrically with respect to X direction in which the second conductor pattern 52 located at the center among the three second conductor patterns 51, 52, 53 extends. In the present embodiment, the plurality of conductors 71, 72 are placed symmetrically with respect to center lines C-C, D-D, E-E of the respective widths of the second conductor patterns 51, 52, 53.

As described above, in the feeder line 1 according to embodiment 4, the plurality of conductors 71, 72 are placed symmetrically with respect to the center lines C-C, D-D, E-E of the respective widths of the second conductor patterns 51, 52, 53. Thus, robustness of the feeder line 1 can be improved.

Embodiment 5

Figure 18:
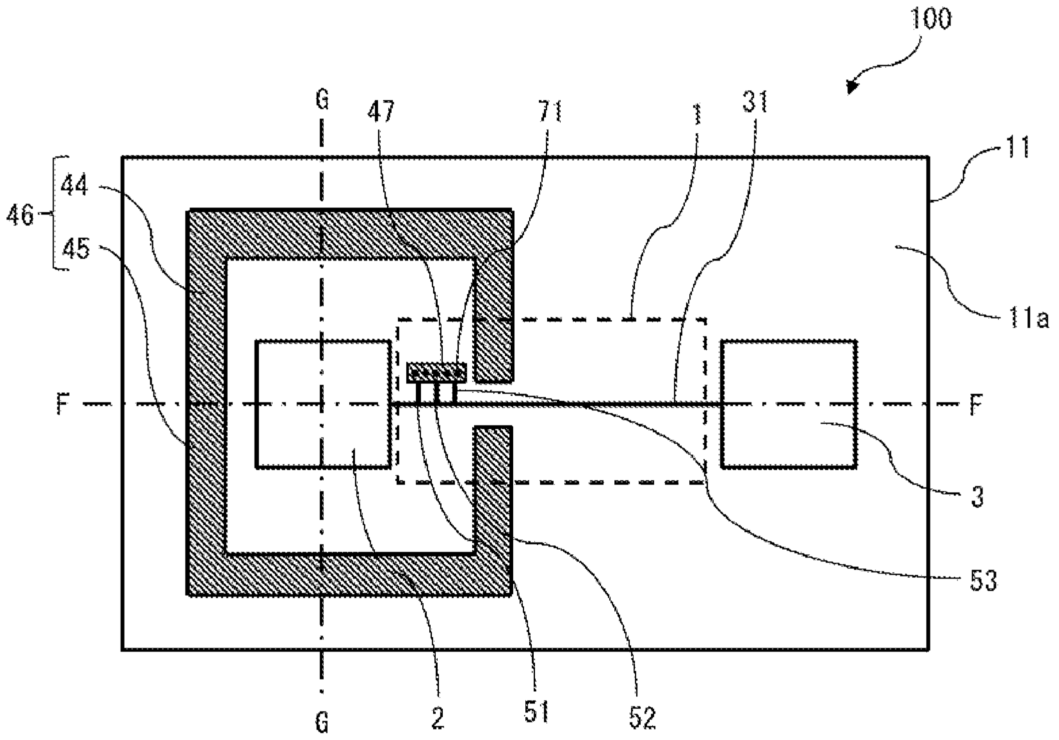
FIG. 18 is a schematic view schematically showing an antenna device according to embodiment 5.
Figure 19:
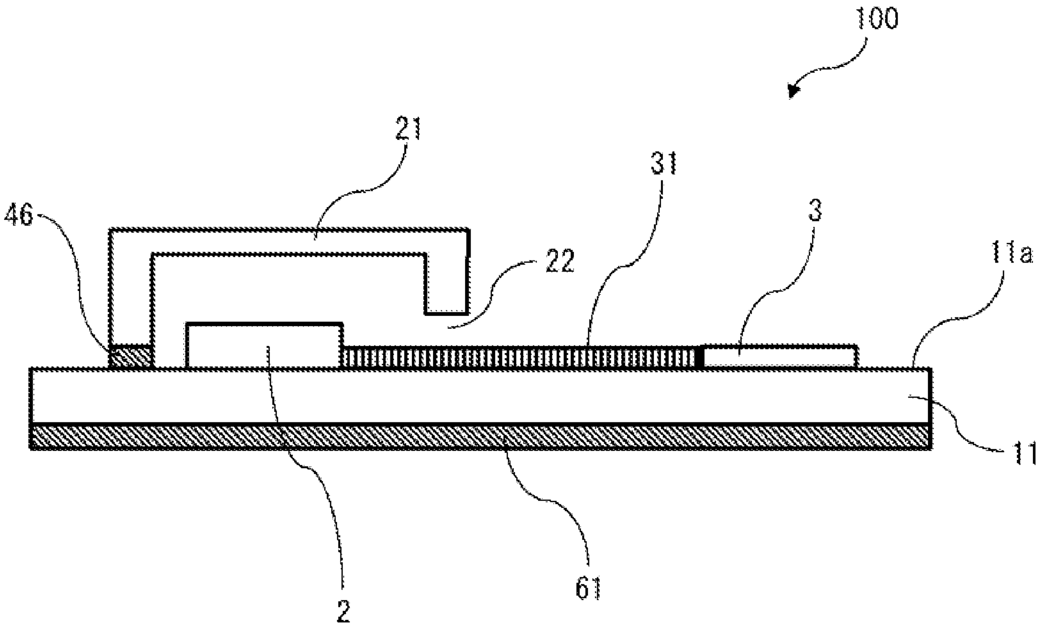
FIG. 19 is a specific-part sectional view of the antenna device taken at an F-F cross-section position in FIG. 18.
Figure 20:
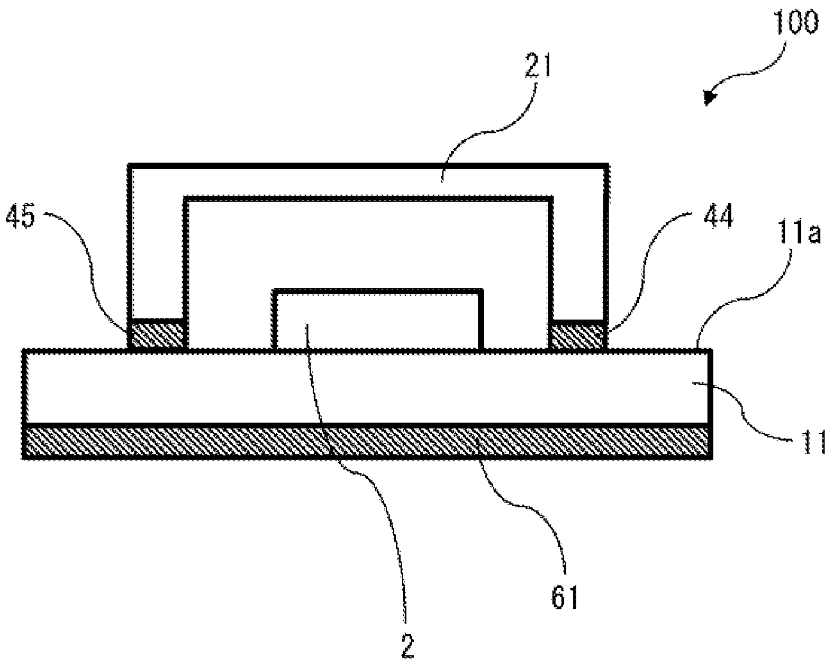
FIG. 20 is a specific-part sectional view of the antenna device taken at a G-G cross-section position in FIG. 18.
Figure 21:
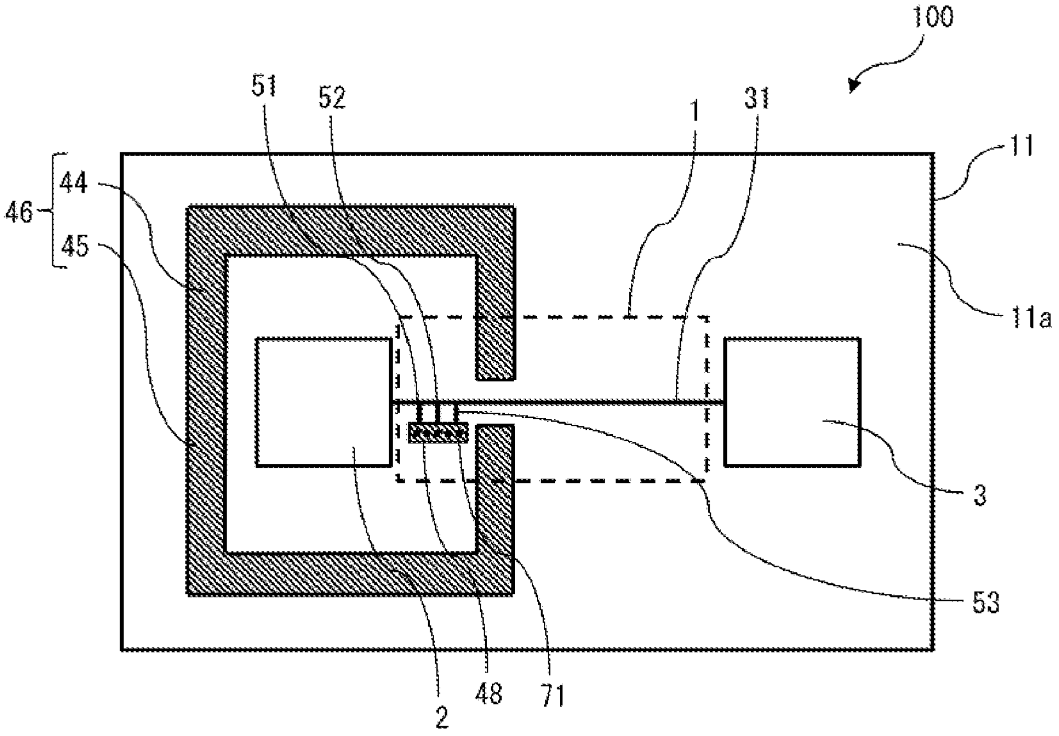
FIG. 21 is a schematic view schematically showing another antenna device according to embodiment 5.
Figure 22:
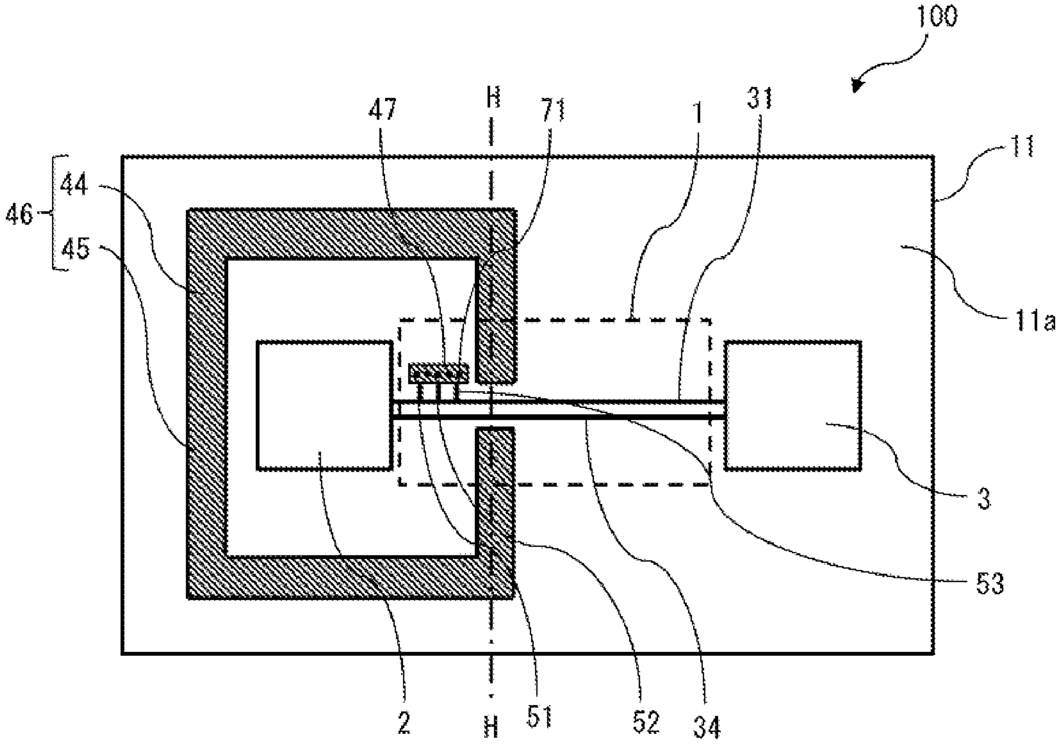
FIG. 22 is a schematic view schematically showing another antenna device according to embodiment 5.
Figure 23:
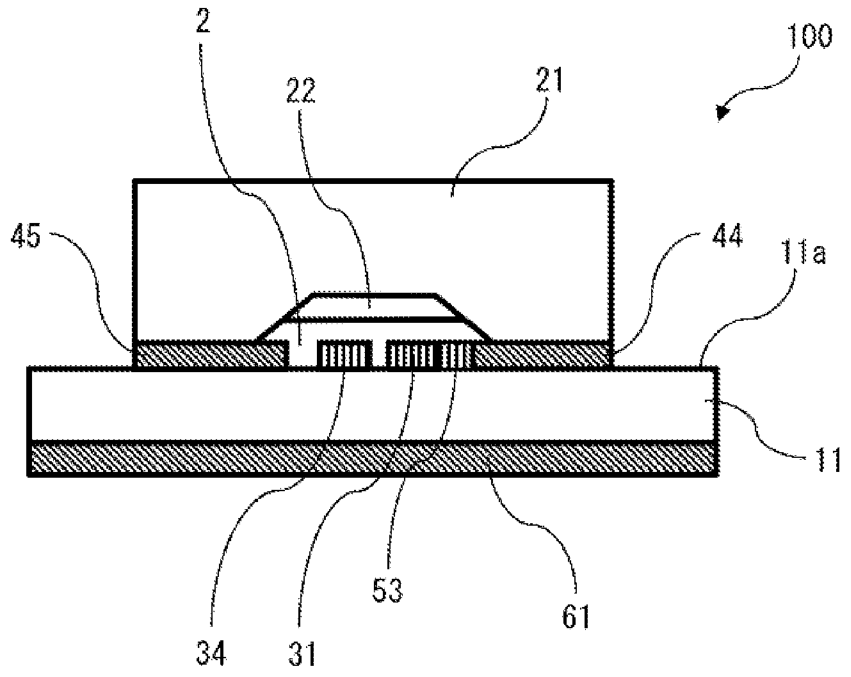
FIG. 23 is a specific-part sectional view of the antenna device taken at an H-H cross-section position in FIG. 22.
Figure 24:
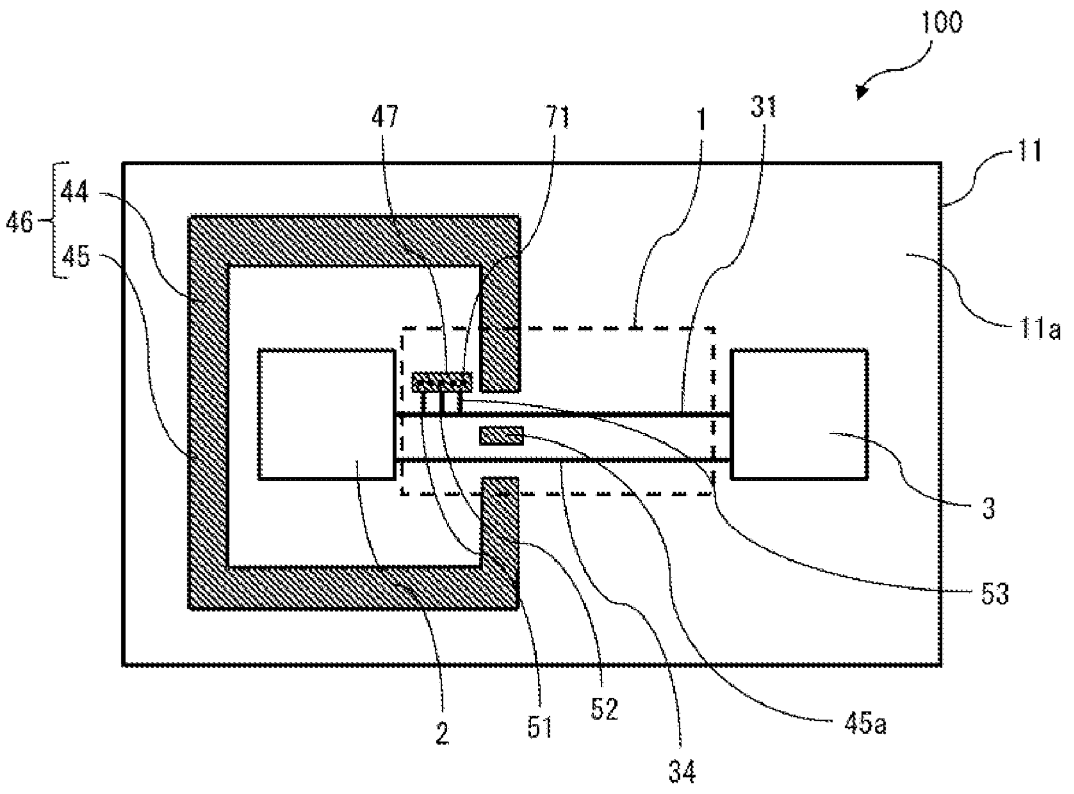
FIG. 24 is a schematic view schematically showing another antenna device according to embodiment 5.

An antenna device 100 according to embodiment 5 will be described. FIG. 18 is a schematic view schematically showing the antenna device 100 according to embodiment 5, FIG. 19 is a specific-part sectional view of the antenna device 100 taken at an F-F cross-section position in FIG. 18, FIG. 20 is a specific-part sectional view of the antenna device 100 taken at a G-G cross-section position in FIG. 18, FIG. 21 is a schematic view schematically showing another antenna device 100 according to embodiment 5, FIG. 22 is a schematic view schematically showing another antenna device 100 according to embodiment 5, FIG. 23 is a specific-part sectional view of the antenna device 100 taken at an H-H cross-section position in FIG. 22, and FIG. 24 is a schematic view schematically showing another antenna device 100 according to embodiment 5. In the schematic views, the conductive member 21 is not shown, and only in the sectional views, the conductive member 21 is shown. The antenna device 100 according to embodiment 5 is configured to have a surrounding ground conductor pattern 46 surrounding the high-frequency signal generator 2.

On the first surface 11*a* of the dielectric substrate 11, a first-area ground conductor pattern 44 and a second-area ground conductor pattern 45 for surrounding formed so as to surround the high-frequency signal generator 2 except for the connection part with the first conductor pattern 31, are provided. The first-area ground conductor pattern 44 and the second-area ground conductor pattern 45 for surrounding formed so as to surround the high-frequency signal generator 2, correspond to the surrounding ground conductor pattern 46. On the inner side of the surrounding ground conductor pattern 46, one or both of a first-area ground conductor pattern on inner side and a second-area ground conductor pattern on inner side are provided. The antenna device 100 shown in FIG. 18 includes a first-area ground conductor pattern 47 on inner side. In the present embodiment, the surrounding ground conductor pattern 46 is formed in a rectangular annular shape that is partially cut out, so as to have an angled C shape. However, the shape of the surrounding ground conductor pattern 46 is not limited thereto, and may be an annular shape, for example.

At least one second conductor pattern connects the first conductor pattern 31 and one or both of the first-area ground conductor pattern on inner side and the second-area ground conductor pattern on inner side, on the inner side of the surrounding ground conductor pattern 46. The antenna device 100 shown in FIG. 18 has the second conductor patterns 51, 52, 53, and the second conductor patterns 51, 52, 53 connect the first-area ground conductor pattern 47 on inner side and the first conductor pattern 31. With this configuration, noise to enter the high-frequency signal generator 2 can be suppressed at a stage just before the high-frequency signal generator 2, whereby the antenna device 100 becomes less likely to be subjected to electromagnetic interference from outside. Thus, electromagnetic compatibility (EMC) can be improved.

On the inner side of the surrounding ground conductor pattern 46, the high-frequency signal generator 2 and one or both of the first-area ground conductor pattern on inner side and the second-area ground conductor pattern on inner side are placed so as to be arranged in the direction in which the first conductor pattern 31 extends. In the antenna device 100 shown in FIG. 18, the high-frequency signal generator 2 and the first-area ground conductor pattern 47 on inner side connected to the second conductor patterns 51, 52, 53 are placed so as to be arranged in the direction in which the first conductor pattern 31 extends. With this configuration, the high-frequency signal generator 2 and the first-area ground conductor pattern 47 on inner side are placed closely to each other, whereby it becomes possible to further suppress noise to enter the high-frequency signal generator 2 at a stage just before the high-frequency signal generator 2. Placement of the first-area ground conductor pattern 47 on inner side is not limited to that described above, and the first-area ground conductor pattern 47 on inner side may not be placed so as to be arranged with the high-frequency signal generator 2 in the direction in which the first conductor pattern 31 extends, on the inner side of the surrounding ground conductor pattern 46.

As shown in FIG. 19 and FIG. 20, the conductive member 21 is formed so as to straddle and cover the high-frequency signal generator 2 and the first conductor pattern 31. The conductive member 21 is connected to the surrounding ground conductor pattern 46 and thus is grounded. The conductive member 21 has the recess 22 at the part straddling the first conductor pattern 31. By the conductive member 21 covering the high-frequency signal generator 2, the high-frequency signal generator 2 becomes less likely to be subjected to electromagnetic interference from outside. The plurality of conductors 71 are through holes penetrating the dielectric substrate 11 and connecting between the second-surface ground conductor pattern 61, and the first-area ground conductor pattern 44, the second-area ground conductor pattern 45, and the first-area ground conductor pattern 47 on inner side. The conductors 71 provided to the first-area ground conductor pattern 44 and the second-area ground conductor pattern 45 are not shown in the schematic views and the sectional views.

In the present embodiment, the configuration in which the second conductor patterns 51, 52, 53 connect the first-area ground conductor pattern 47 on inner side and the first conductor pattern 31 has been shown, but the present disclosure is not limited thereto. As shown in FIG. 21, the antenna device 100 may be configured such that a second-area ground conductor pattern 48 on inner side is provided and the second conductor patterns 51, 52, 53 connect the second-area ground conductor pattern 48 on inner side and the first conductor pattern 31.

In the present embodiment, the configuration in which the high-frequency signal generator 2 and the antenna 3 are connected to one first conductor pattern 31 has been shown, but the present disclosure is not limited thereto. As shown in FIG. 22 and FIG. 23, the antenna device 100 may be configured such that the first conductor patterns 31, 34 are provided as the plurality of first conductor patterns and the conductive member 21 is connected to the first-area ground conductor pattern 44 and the second-area ground conductor pattern 45 for surrounding, while straddling the first conductor patterns 31, 34 at the recess 22.

In addition, in the case where the antenna device 100 has the plurality of first conductor patterns, as shown in FIG. 24, a second-area ground conductor pattern 45*a* which is a divided ground conductor pattern may be provided at a part between the first conductor patterns 31, 34. The ground conductor pattern to be divided is not limited to the second-area ground conductor pattern 45 and may be the first-area ground conductor pattern 44.

As described above, in the antenna device 100 according to embodiment 5, on the first surface 11*a* of the dielectric substrate 11, the surrounding ground conductor pattern 46 is formed so as to surround the high-frequency signal generator 2 except for the connection part with the first conductor pattern 31, the first-area ground conductor pattern 47 on inner side is provided on the inner side of the surrounding ground conductor pattern 46, and the second conductor patterns 51, 52, 53 connect the first-area ground conductor pattern 47 on inner side and the first conductor pattern 31. Thus, it becomes possible to suppress noise to enter the high-frequency signal generator 2 at a stage just before the high-frequency signal generator 2, whereby the antenna device 100 becomes less likely to be subjected to electromagnetic interference from outside. In addition, electromagnetic compatibility (EMC) of the antenna device 100 can be improved.

In the antenna device 100, in a case where the high-frequency signal generator 2 and the first-area ground conductor pattern 47 on inner side connected to the second conductor patterns 51, 52, 53 are placed so as to be arranged in the direction in which the first conductor pattern 31 extends, the high-frequency signal generator 2 and the first-area ground conductor pattern 47 on inner side are placed closely to each other, whereby it becomes possible to further suppress noise to enter the high-frequency signal generator 2 at a stage just before the high-frequency signal generator 2.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

1 feeder line
2 high-frequency signal generator
3 antenna
11 dielectric substrate
11*a* first surface
11*b* second surface
11*c* first end surface
11*d* second end surface
21 conductive member
22 recess
31 first conductor pattern
31*a* equivalent circuit part
32 input/output end
33 input/output end
34 first conductor pattern
41 first-area ground conductor pattern
42 second-area ground conductor pattern
43 third-area ground conductor pattern
44 first-area ground conductor pattern
45 second-area ground conductor pattern
45*a* second-area ground conductor pattern
46 surrounding ground conductor pattern
47 first-area ground conductor pattern on inner side
48 second-area ground conductor pattern on inner side
51 second conductor pattern
51*a* equivalent circuit part
52 second conductor pattern
52*a* equivalent circuit part
53 second conductor pattern
53*a* equivalent circuit part
54 second conductor pattern
61 second-surface ground conductor pattern
71 conductor
72 conductor
73 conductor
100 antenna device

The invention claimed is:

1. A feeder line comprising:

a dielectric substrate formed in a plate shape;

a first conductor pattern formed on a first surface of the dielectric substrate and extending from a first end surface side of the dielectric substrate toward a second end surface side opposite to the first end surface so as to divide the first surface of the dielectric substrate into a first area and a second area, an end on the first end surface side and an end on the second end surface side of the first conductor pattern serving as signal input/output ends;

a first-area ground conductor pattern formed in the first area divided by the first conductor pattern on the first surface of the dielectric substrate, to be grounded;

a second-area ground conductor pattern formed in the second area divided by the first conductor pattern on the first surface of the dielectric substrate, to be grounded;

a second-surface ground conductor pattern formed on a second surface on a side opposite to the first surface of the dielectric substrate, to be grounded;

at least one second conductor pattern formed on the first surface of the dielectric substrate and connecting the first conductor pattern and one or both of the first-area ground conductor pattern and the second-area ground conductor pattern;

a plurality of conductors penetrating the dielectric substrate and connecting between the second-surface ground conductor pattern, and the first-area ground conductor pattern and the second-area ground conductor pattern; and a conductive member connecting the first-area ground conductor pattern and the second-area ground conductor pattern while straddling the first conductor pattern, wherein a length of the one second conductor pattern is an odd multiple of ¼ of a wavelength of a signal propagating through the first conductor pattern.

2. The feeder line according to claim 1, comprising a plurality of the second conductor patterns, wherein the plurality of second conductor patterns are placed so as to be arranged in a direction in which the first conductor pattern extends, from the first end surface side toward the second end surface side of the dielectric substrate, and an interval of parts where the second conductor patterns and the first conductor pattern are connected to each other is an integer multiple of ¼ of the wavelength of the signal propagating through the first conductor pattern.

3. The feeder line according to claim 1, comprising a plurality of the first-area ground conductor patterns and/or a plurality of the second-area ground conductor patterns on the first surface of the dielectric substrate.

4. The feeder line according to claim 1, wherein the signal is a microwave band or millimeter-wave band signal.

5. The feeder line according to claim 1, wherein the first conductor pattern is a microstrip line or a coplanar line with a ground conductor.

6. The feeder line according to claim 1, wherein the conductive member is metal or conductive resin.

7. The feeder line according to claim 1, wherein a shape of the conductive member at a part straddling the first conductor pattern, in a direction perpendicular to a plate surface of the dielectric substrate, is a rectangular shape, a trapezoidal shape, or a semicircular shape.

8. The feeder line according to claim 1, wherein the first conductor pattern and the second conductor pattern are each formed so as to have a constant width along their respective signal propagating directions on the first surface of the dielectric substrate.

9. The feeder line according to claim 1, wherein the first conductor pattern and the second conductor pattern are each formed so as to have a varying width along their respective signal propagating directions on the first surface of the dielectric substrate.

10. An antenna device comprising:

the feeder line according to claim 1;

a high-frequency signal generator connected to one of the input/output ends of the first conductor pattern included in the feeder line; and an antenna connected to another of the input/output ends of the first conductor pattern included in the feeder line.

11. The antenna device according to claim 10, wherein on the first surface, the first-area ground conductor pattern and the second-area ground conductor pattern for surrounding formed so as to surround the high-frequency signal generator except for a connection part with the first conductor pattern, are provided, on an inner side of the first-area ground conductor pattern and the second-area ground conductor pattern for surrounding, one or both of the first-area ground conductor pattern on inner side and the second-area ground conductor pattern on inner side are provided, the at least one second conductor pattern connects the first conductor pattern and one or both of the first-area ground conductor pattern on inner side and the second-area ground conductor pattern on inner side, on the inner side of the first-area ground conductor pattern and the second-area ground conductor pattern for surrounding, and the conductive member is formed so as to straddle and cover the high-frequency signal generator and the first conductor pattern, and is connected to the first-area ground conductor pattern and the second-area ground conductor pattern for surrounding.

12. The antenna device according to claim 11, wherein on the inner side of the first-area ground conductor pattern and the second-area ground conductor pattern for surrounding, the high-frequency signal generator and one or both of the first-area ground conductor pattern on inner side and the second-area ground conductor pattern on inner side are placed so as to be arranged in a direction in which the first conductor pattern extends.

13. A feeder line comprising:

a dielectric substrate formed in a plate shape;

at least two first conductor patterns formed on a first surface of the dielectric substrate and extending from a first end surface side of the dielectric substrate toward a second end surface side opposite to the first end surface so as to divide the first surface of the dielectric substrate into a first area and a second area, an end on the first end surface side and an end on the second end surface side of each first conductor pattern serving as signal input/output ends;

a first-area ground conductor pattern formed in the first area divided by the first conductor patterns on the first surface of the dielectric substrate, to be grounded;

a second-area ground conductor pattern formed in the second area divided by the first conductor patterns on the first surface of the dielectric substrate, to be grounded;

a second-surface ground conductor pattern formed on a second surface on a side opposite to the first surface of the dielectric substrate, to be grounded;

a third-area ground conductor pattern formed in a third area between the two first conductor patterns on the first surface of the dielectric substrate, to be grounded;

at least one second conductor pattern formed on the first surface of the dielectric substrate and connecting the third-area ground conductor pattern and the first conductor pattern;

a plurality of conductors penetrating the dielectric substrate and connecting between the second-surface ground conductor pattern, and the first-area ground conductor pattern, the second-area ground conductor pattern, and the third-area ground conductor pattern; and a conductive member connecting the first-area ground conductor pattern and the second-area ground conductor pattern while straddling the first conductor patterns, wherein a length of the one second conductor pattern is an odd multiple of ¼ of a wavelength of a signal propagating through the first conductor pattern.

* * * * *